United States Patent [19]

Nakamura et al.

[11] Patent Number: 4,728,980

[45] Date of Patent: Mar. 1, 1988

[54] AUTOMATIC FOCUSING DEVICE AND AUTOMATIC EXPOSURE CONTROL DEVICE

[75] Inventors: Akiyoshi Nakamura; Makoto Ando, both of Sakai; Shuji Ogino, Kawachinagano; Nobuyuki Taniguchi, Nishinomiya, all of Japan

[73] Assignee: Minolta Camera Kabushiki Kaisha, Osaka, Japan

[21] Appl. No.: 893,363

[22] Filed: Aug. 4, 1986

[30] Foreign Application Priority Data

Aug. 5, 1985 [JP] Japan .................................. 60-172697
Aug. 6, 1985 [JP] Japan .................................. 60-173747
Aug. 7, 1985 [JP] Japan .................................. 60-173852

[51] Int. Cl.$^4$ .............................................. G03B 3/00
[52] U.S. Cl. ................................. 354/402; 354/195.12; 354/286
[58] Field of Search ................. 354/400, 195.1, 195.12, 354/286, 402

[56] References Cited

U.S. PATENT DOCUMENTS 4,572,638  2/1986  Nakai et al. ......................... 354/286
4,589,753  5/1986  Kawai ................................. 354/286
4,627,699 12/1986  Takagi ............................. 354/195.12

Primary Examiner—Russell E. Adams
Attorney, Agent, or Firm—Burns, Doane, Swecker & Mathis

[57] ABSTRACT

An automatic focusing device which comprises a defocus amount detecting unit for detecting a defocus amount attributable to a first optical system of an interchangeable lens assembly and a second optical system of an AF convertor, a converting circuit for converting the defocus amount into a data corresponding to a focusing amount of the second optical system which varies in non-linear relationship to the defocus amount, and an optical drive unit for moving the second optical system on the basis of a data representative of the focusing amount supplied from the converting circuit.

4 Claims, 21 Drawing Figures

AUTOMATIC FOCUSING DEVICE AND AUTOMATIC EXPOSURE CONTROL DEVICE

BACKGROUND OF THE INVENTION

1. Field of Technology

The present invention relates to an automatic focusing device for any interchangeable lens assembly having no auto-focusing function.

The present invention also relates to an automatic exposure control device for enabling an exposure control function to effect an automatic exposure control regardless of the type of a photo-taking optical system, that is, when a photo-taking optical system adaptable to a full aperture metering and exposure calculating means is mounted, or when a photo-taking optical system not adaptable to the full aperture metering and exposure calculating means is mounted, or when a photo-taking optical system other than the above mentioned two photo-taking optical systems is mounted.

2. Description of the Prior Art

As is well known to those skilled in the art, a lens-interchangeable camera system havng an automatic focusing capability now commercially available is such that the automatic focusing capability does not work when any interchangeable lens assembly inadaptable to the automatic focusing capability of such camera system is mounted on such camera system.

Moreover, when an aperture control system in a lens assembly is changed, an automatic aperture presetting capability (an automatic aperture control) does not work, also.

In view of the foregoing, a system has been proposed wherein a convertor is interposed between a camera body and any interchangeable lens assembly inadaptable to the automatic focusing capability to make the automatic focusing capability work very well, such as disclosed in, for example, the Japanese Laid-open Patent Publications No. 58-098711, No. 58-098712, and No. 58-114008.

The Japanese Laid-open Patent Publication No. 59-140408 discloses a system wherein the automatic focusing capability can work only when data read from an interchangeable lens assembly are acceptable to the camera system, but cannot work when they are not acceptable to the camera system. The Japanese Laid-open Patent Publication No. 58-211127 discloses a system wherein the full aperture metering and exposure calculating means can work only when data read from an interchangeable lens assembly are acceptable to the camera system, but an actual aperture metering and exposure calculating capability can work when they are not acceptable to the camera system.

It has, however, been found that the prior art systems disclosed in the Japanese Laid-open Patent Publications No. 58-098711, No. 58-098712 and No. 58-114008 have numerous problems which will now be discussed. More specifically, according to these prior art patent literatures, much attention is centered on the automatic focus detecting function, and no automatic exposure control (aperture control) is taken into consideration. Therefore, even though the convertor referred to above is used, an automatic exposure control operation cannot take place when the aperture control system is changed.

Apart from the above, a system has not yet been made available wherein both the automatic focusing capability and the exposure control capability are enabled even if an interchangeable lens assembly having a photo-taking optical system inadaptable to the full aperture metering and exposure calculating means is mounted.

In summary, the prior art systems wherein the photo-taking optical system inadaptable to the full aperture metering and exposure calculating means is mounted with the intervention of the convertor are insufficient in respect of function, which largely limits the available types of optical systems.

Furthermore the prior art automatic focusing system has the following problems. Specifically, the system is so designed as to detect a front focus condition, a rear focus condition and an in-focus condition, and does not perform an automatic focus adjustment by calculating beforehand the amount through which a convertor lens is to be moved. In other words, since based on a detection data derived from the front focus condition, the rear focus condition or the in-focus condition the convertor lens is moved on a feedback control scheme, it often happens that the lens undergoes a hunting. In order to avoid the occurrence of the hunting of the convertor lens, the speed of movement of the convertor lens (the focusing speed) has to be lowered.

Moreover, despite the fact that a focus detecting unit provided in the camera body is capable of determining a defocus amount, all of the available functions capable of being performed by the focus detecting unit cannot be fully utilized to advantage with the speed of movement of the convertor lens (the focusing speed) set to a low value, because nothing other than information representative of the front focus condition, the rear focus condition and the in-focus condition is utilized for the automatic focus adjustment.

This is due to the fact that the defocus amount and the focusing amount of the convertor lens have no linear relationship with respect to each other and, therefore, no accurate focusing amount can be determined.

Furthermore, the distance to a target object to be photographed is so varied that only the movement of the convertor lens would not always bring the target object into the desired in-focus condition. If the focusing is insufficient only by means of the automatic movement of the converter lens, the interchangeable lens assembly must also be moved manually for a complete focus adjustment.

Although the automatic focusing device is going to perform the automatic focus adjustment by moving the convertor lens, the convertor lens would be brought to one of the opposite limit positions between which it can move, in the event that the distance to the target object is such that the target object cannot be focused only by the movement of the convertor lens used in an AF convertor.

According to the prior art automatic focusing device such as disclosed in the Japanese Laid-open Patent No. 58-098711, when the convertor lens is brought to one of the opposite limit positions, a position detecting switch is closed to effect a warning that the automatic focus adjustment cannot be accomplished only by the movement of the convertor lens.

In other words, a decision to determine if the distance to the target object is such that the automatic focus adjustment cannot be accomplished only by the movement of the convertor lens cannot be made before the actual movement of the convertor lens, but done only when and after the converter lens is actually brought to one of the opposite limit position to cause the warning.

In view of the foregoing, a quick decision cannot be made to determine if the additional manual focus adjustment is to be needed in the interchangeable lens assembly, and therefore, a quick focus adjustment cannot be carried out.

SUMMARY OF THE INVENTION

The present invention has been devised with a view to substantially eliminating the problems inherent in the prior art systems and has for its essential object to increase the focusing speed of the AF converter while all of the functions available in the focus detecting unit are utilized advantageously, without reducing the focusing accuracy.

Another object of the present invention is to facilitate a highly precise focus adjustment by means of an AF converter on an automatic basis.

A further object of the present invention is to enable the photographer to be informed of the necessity or non-necessity of the manual focus adjustment in the interchangeable lens assembly in addition to the automatic focus adjustment in the AF converter prior to the movement of the convertor lens in the AF converter, so that the focus adjustment can be done quickly.

A still further object of the present invention is to provide an automatic exposure control device wherein, regardless of whether the first photo-taking optical system adaptable to the full aperture metering and exposure calculating means is mounted or whether the second photo-taking optical system not adaptable to the full aperture metering and exposure calculating means is mounted, both of the automatic focusing capability and the automatic exposure control capability can work.

A yet further object of the present invention is to provide an automatic exposure control device of the type referred to above, wherein, even when none of the first and second photo-taking optical systems is mounted, the automatic exposure control capability can work while the automatic focusing capability is disabled.

In order to accomplish these objects of the present invention, the present invention is structured as shown in any one of FIGS. 1 to 4 of the accompanying drawings, reference to which will now be made.

The automatic focusing device of the present invention comprises, as shown in FIG. 1, a defocus amount detecting means DFDM for detecting the defocus amount d attributable to the first optical system Le in the interchangeable lens assembly B and the second optical system CL in the AF convertor A.

In view of the fact that the focusing amount x of the second optical system CL in the AF convertor A, which amount x corresponds to the necessary movement of CL, varies in a non-linear relationship with the defocus amount d, the automatic focusing device also comprises a defocus amount/focusing amount data converting means DMDM for converting the defocus amount d into the focusing amount x.

The automatic focusing device furthermore comprises an optical system drive means LDM for moving the second optical system CL in the AF convertor A on the basis of a data of the focusing amount x supplied from the converting means DMDM.

With this construction, since the defocus amount-/focusing amount data converting means serves to render the focusing amount of the second optical system of the AF convertor and the defocus amount, which have a non-linear relationship with each other, to have a certain one-to-one relationship, the focusing amount of the second optical system which is obtained by converting the defocus amount can be made a value enough to make the defocus amount zero. Thus, the focusing amount of the second optical system obtained by converting the defocus amount represents a distance of movement necessary to substantially zero the defocus amount.

The defocus amount/focusing amount data converting means is operable to convert the defocus amount so obtained into the optimum focusing amount data of the second optical system enough to make the defocus amount zero.

And, since prior to the actual focusing movement of the second optical system of the AF convertor the optical system drive means control the drive of the second optical system on the basis of the focusing amount data so obtained, the second optical system can be controlled during the actual focusing movement so that the defocus amount may be substantially zero.

In other words, since the focusing amount data can be obtained prior to the actual focusing movement of the second optical system, the automatic focusing capability can be effectively executed. Therefore, there is no possibility that the second optical system may undergo hunting at a position near the in-focus position such as occurring with the prior art feedback control system, and the high speed, highly precise automatic focusing can be accomplished.

The function of the defocus amount detecting means, which has hitherto been provided in the automatic focusing device, for the determination of the defocus amount can be effectively utilized in improving the focusing accuracy.

According to another feature of the present invention, the automatic focusing device comprises, as best shown in FIG. 2, a focusing amount calculating means PMCM for calculating the focusing amount x over which the second optical system CL to be moved in order to bring the imagewise light of the target object, which has passed through the first and second optical systems Le and CL, from the defocused condition into the in-focus condition.

Also, the automatic focusing device according to said another preferred embodiment comprises a current position data outputting means PDOM for outputting a current position data Lp representative of the current position of the second optical system CL of the AF convertor A, and a limit position data outputting means EDOM for outputting a farthest limit position data Lmax representative of the farthest limit position of extension of the second optical system CL and a closest limit position data Lo representative of the closest limit position of retraction of the second optical system CL.

In addition the automatic focusing device comprises a focus control determining means PCJM for determining, on the basis of the focusing amount x supplied from the calculating means PMCM, the current position data Lp and the farthest or closest limit position data Lmax or Lo, whether or not the imagewise light of the target object can be controlled into the in-focus condition if said second optical system CL is moved a distance corresponding to the focusing amount x, and a first optical system moving direction display means FMDM for displaying the direction in which the first optical system Le of the interchangeable lens assembly is to be moved for bringing the imagewise light of the target object, which is in the defocused condition, into the in-focus condition, in the event that the determining means makes a negative decision.

In the event that the interchangeable lens assembly has no autmtic focusing capability and the focus control cannot be accomplished merely by the movement of the second optical system, the first optical system of the interchangeable lens assembly has to be moved for the focus adjustment.

With this construction according to the present invention, when the focus control determining means makes a decision, on the basis of the focusing amount x, the current position data Lp, and the farthest or closest limit position data Lmax or Lo, that the focus control is impossible, the first optical system moving direction display means FMDM effects a display of the direction in which the first optical system of the interchangeable lens assembly is moved for focusing the target object from the defocused condition.

That is, the photographer can be informed that the movement of the second optical system only cannot result in the accurate focus control and, accordingly, the first optical system of the interchangeable lens assembly has to be moved for the focus control.

Accordingly, the manipulation necessary to move first optical system for the focus control, which is to be done by the photographer, can be quickly carried out.

If desired, the automatic focusing device according to the present invention may be provided, as shown in FIG. 3, with a second optical system drive means SDM for driving the second optical system CL to one of the farthest and closest limit positions in a direction in which the in-focus condition lies, in the event that the determining means PCJM makes the negative decision.

The employment of the second optical system drive means is advantageous in that, in the event that the focus control determining means makes the negative decision that the focus control is impossible, the second optical system drive means drives the second optical system of the AF convertor towards the limit position in search for the true focus setting.

Then, the photographer having been informed that the automatic focus control is impossible and, therefore, the first optical system must be moved in the direction displayed manually moves the first optical system. Since during the focusing the second optical system has been moved to the limit position so that the movement of the first optical system necessitated for the true focus setting could be minimized, the photographer can quickly carry out the focus control.

The present invention also provides an automatic exposure control device which comprises, as shown in FIG. 4, a full aperture metering and exposure calculating means OMEOM, an actual aperture metering and exposure calculating means RMEOM, and a mounted optical system detecting means ODM for detecting a first condition in which the first photo-taking optical system FPOS adaptable to the full aperture metering and exposure calculating means OMEOM is mounted, a second condition in which the second photo-taking optical system SPOS inadaptable to the full aperture metering and exposure calculating means OMEOM is mounted, and a third condition in which none of the photo-taking systems FPOS and SPOS is mounted.

Also, the automatic exposure control device also comprises an automatic focus adjusting means FDM for adjusting the point of focus of the first photo-taking optical system and the point of focus of the second photo-taking optical system, and a control means CONT for driving both of the automatic focus adjusting means FDM and the full aperture metering and exposure calculating means OMEOM upon the detection of the first condition by the mounted optical system detecting means ODM, for driving both of the automatic focus adjusting means FDM and the actual aperture metering and exposure calculating means RMEOM upon the detection of the second condition by the mounted optical system detecting means ODM, and for disabling the automatic focus adjusting means FDM and driving the actual aperture metering and exposure calculating means RMEOM upon the detection of the third condition by the mounted optica system detecting means FDM.

With the automatic exposure control device according to the present invention, since in the event that the first photo-taking optical system adaptable to the full aperture metering and exposure calculating means is mounted the mounted optical system detecting means detects the mounting of such first photo-taking optical system to enable the control means to drive both of the automatic focus adjusting means and the full aperture metering and exposure calculating means, both of the exposure control and the automatic focus adjustment appropriate to the first photo-taking optical system can be performed.

Since the control means drives both of the automatic focus adjusting means and the actual aperture metering and calculating means in the event that the mounted optical system detecting means detects the mounting of the second optical system inadaptable to the full aperture metering and exposure calculating means, the automatic focus adjustment and the proper exposure control based on the actual aperture metering and exposure calculating means can be performed inspite of the fact that the second photo-taking optical system inadaptable to the full aperture metering and exposure calculating means has been mounted.

In the event that none of the first and second photo-taking optical systems is mounted, the mounted optical system detecting means detects the non-mounted condition and the control means disables the automatic focus adjusting means and enables the actual aperture metering and exposure calculating means. Therefore, even in this case in which a third photo-taking optical system such as bellows may be mounted, the proper exposure control appropriate to the photo-taking system then used can be performed.

BRIEF DESCRIPTION OF THE DRAWINGS

These and other objects and features of the present invention will become readily understood from the following description taken in conjunction with preferred embodiments of thereof with reference to the accompanying drawings, in which.

DETAILED DESCRIPTION OF THE EMBODIMENTS

Before the description of the present invention proceeds, the principle of the present invention will now be described with reference to FIGS. 5 and 6.

Figure 6:
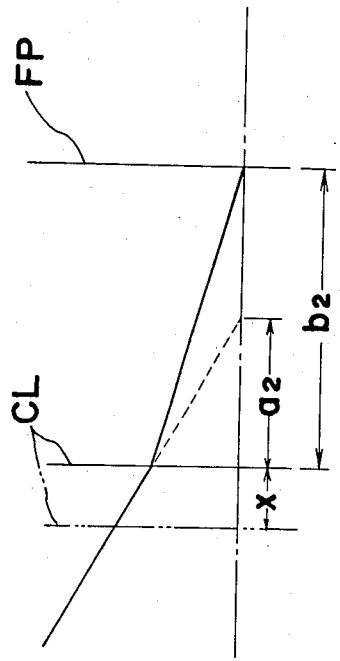
FIGS. 5 and 6 are graphs used to explain the principle of the present invention.

FIG. 6 illustrates a defocused condition wherein the rear position of the principal point of the second optical system CL in the AF converter is located spaced a distance L from the film plane FP, the focal point of the first optical system (not shown) in the interchangeable lens assembly positioned frontwardly of the second optical system CL is located spaced a distance $a_1$ from the second optical system CL, and an image of the focal point thereof is re-formed at a position deviated a distance (defocus amount) d from the film plane FP.

Figure 5:
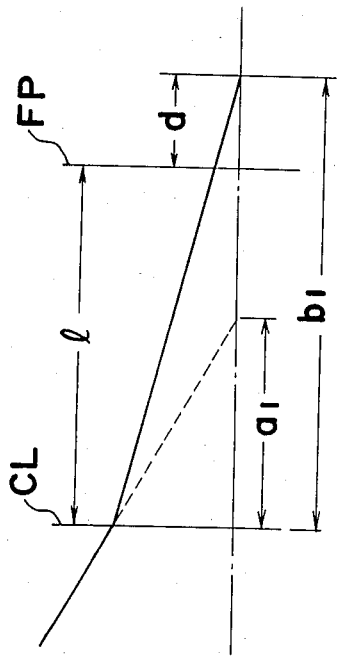

FIG. 6 illustrates a condition wherein a final image is formed on the film plane FP, which condition is established when, starting from the condition of FIG. 5, the second optical system CL is moved a distance x in a direction towards the film plane FP.

Assuming that the second optical system CL has a focal length f, the following relationships can be observed respectively from the conditions of FIGS. 5 and 6:

$$1/a_1 + 1/b_1 = 1/f \quad (1)$$

$$b_1 = d + l \quad (2)$$

$$1/a_2 + 1/b_2 = 1/f \quad (3)$$

$$a_2 = a_1 - x \quad (4)$$

$$b_2 = l - x \quad (5)$$

From the equations (3), (4) and (5), $$[1/(a_1 - x)] + [1/(l - x)] = 1/f \quad (6)$$

Modifying the equation (6) results in the following quadratic equation:

$$x^2 + (2f - l - a_1)x + (a_1 l - fl - a_1 f) = 0 \quad (7)$$

From the equation (1), $$a_1 = [f(d + l)] / [d + l - f] \quad (8)$$

f represents the focal length of the second optical system CL in the AF converter, the value of which is known. L represents the distance between the rear position of the principal point of the second optical system CL and the film plane FP at the time of start of the distance measurement, and d represents the distance between the position at which the image is re-formed by the second optical system CL and the film plane FP at the time of start of the distance measurement, that is, the defocus adjustment.

The parameter x used in the equation (7) represents the amount of movement (focusing amount) of the second optical system CL for focus adjustment.

From the equations (7) and (8), it will readily be understood that the focusing amount x of the second optical system CL has a non-linear relationship with the defocus amount d.

When the parameters L and d at the time of start of the distance measurement are evaluated, the parameter $a_1$ can be fixed from the equation (8). Once the parameter $a_1$ is fixed, the focusing amount x of the second optical system CL necessary for the focus adjustment can be determined from the equation (7).

By way of example, let it be assumed that the interchangeable lens assembly has its first optical system (photo-taking lens system: Gauss type) comprised of a plurality of lenses L1 to L6, and the AF converter A has its second optical system (converter lens system) CL comprised of a plurality of lenses L7 to L11. The relationships of these lenses in radius of curvature, axial distances, refractive index and Abbe number are listed in Table 1.

TABLE 1

| Lens | | Radius of Curvature (mm) | Axial Distance (mm) | Refractive Index | Abbe Number |
|---|---|---|---|---|---|
| L1 | r1 | 38.60 | d1 3.01 | $N_d$ 1.781 | $\gamma_d$ 44.5 |
|  | r2 | 341.34 | d2 0.12 | | |
| L2 | r3 | 20.07 | d3 3.45 | $N_d$ 1.7495 | $\gamma_d$ 50.1 |
|  | r4 | 30.10 | d4 1.39 | | |
| L3 | r5 | 71.78 | d5 1.21 | $N_d$ 1.7006 | $\gamma_d$ 30.1 |
|  | r6 | 15.91 | d6 9.42 | | |
| L4 | r7 | −13.38 | d7 1.21 | $N_d$ 1.6398 | $\gamma_d$ 34.7 |
|  | r8 | −75.20 | d8 3.98 | $N_d$ 1.7545 | $\gamma_d$ 51.6 |
| L5 | r9 | −18.20 | d9 0.12 | | |
| L6 | r10 | 639.96 | d10 3.06 | $N_d$ 1.6968 | $\gamma_d$ 55.5 |
|  | r11 | −33.71 | d11 * | | |
| L7 | r12 | 262.97 | d12 1.10 | $N_d$ 1.7425 | $\gamma_d$ 52.5 |
| L8 | r13 | 16.46 | d13 8.00 | $N_d$ 1.5927 | $\gamma_d$ 35.3 |
|  | r14 | −25.7 | d14 1.10 | $N_d$ 1.7545 | $\gamma_d$ 51.6 |
| L9 | r15 | 71.0 | d15 14.31 | | |

TABLE 1-continued

| Lens | | Radius of Curvature (mm) | Axial Distance (mm) | Refractive Index | Abbe Number |
|---|---|---|---|---|---|
| L10 | r16 | −103.72 | d16 1.50 | $N_d$ 1.8052 | $\gamma_d$ 25.4 |
| | r17 | 112.42 | d17 0.53 | | |
| L11 | r18 | 67.08 | d18 9.00 | $N_d$ 1.5111 | $\gamma_d$ 60.5 |
| | r19 | −31.44 | | | |

The lenses L4 and L5 are held in contact with each other and the lenses L7 to L9 are also held in contact with each other. Each of d2, d4, d6, d9, d15, and d17 represents the distance between the respective neighboring lenses.

In this case, the focal length f of the second optical system CL of the AF converter A comprised of the lenses L7 to L11 is −139.95 mm.

The distance d11 between the first optical system, comprised of the lenses L1 to L6, and the second optical system CL is variable by moving the AF converter A away from the interchangeable lens assembly and close towards the film plane FP and by moving the AF converter A close towards the interchangeable lens assembly and away from the film plane FP.

It is assumed that, when the distance d11 is 2.0, the lens is focused at infinity (Photo-taking magnification $\beta=0$), and when the distance 11 is 5.0, the lens is focused at a target object spaced the smallest available distance away from the lens, with the photo-taking magnification $\beta$ being 1/10. If the photo-taking magnification $\beta$ is within the range of 0 to 1/10, the entire range of the distance to the target object can be substantially covered.

In Table 2, there are illustrated examples of relationship of the focusing amount x of the second optical system C with the focal length (f=139.95 mm) of the second optical system CL, the distance L between the rear position of the principal point of the second optical system CL and the film plane FP and the defocus amount d which is the distance between the position at which the final image is formed and the film plane FP, which are determined by the use of the equation (7).

TABLE 2

| | Focusing Amount X (f = −139.95) | | | | |
|---|---|---|---|---|---|
| | | | d | | |
| l | −10 | −5 | 0 | +5 | +10 |
| 141 | 2.066 | 1.012 | 0 | −0.977 | −1.923 |
| 140 | 2.071 | 1.018 | 0 | −0.983 | −1.933 |
| 139 | 2.083 | 1.023 | 0 | −0.988 | −1.944 |
| 138 | 2.095 | 1.029 | 0 | −0.994 | −1.954 |

In Table 2, the negative (−) sign represents that the second optical system CL of the AF converter A is moved in a direction close towards the film plane FP.

The distance 1 attains 141 when the lens is focused at infinity. In this case, as hereinbefore described, the spacing distance d11 is 2.0 (Photo-taking magnification $\beta=0$), and in the case of the spacing distance d11 being 5.0 which is obtained by adding 3.0 to 2.0, the distance L is 138 and the photo-taking magnification $\beta$ is 1/10.

The focusing amount x will be a function of the focal length f, the distance L and the defocus amount d, since the equation (7) and (8) can be expressed as follows:

$$x^2+(2f-l-a_1)x+(a_1 l -fl-a_1f)=0 \quad (7)$$

$$a_1=[f(d+l)]/[d+l-f] \quad (8)$$

That is:

$$x=F(f, L, d) \quad (9)$$

In order to carry out a high precision focusing operation, it is needless to say that the focal length f must be of a known value and the distances L and the defocus amount d must be accurately determined.

However, as can be understood from Table 2, when the defocus amount d which represents an amount of deviation of the formed image relative to the film plane FP is fixed, the amount of change of the focusing amount x relative to a small change in distance L which is information indicative of the position of the second optical system CL of the AF converter is very small.

Accordingly, irrespective of the distance L which is the information indicative of the position of the second optical system CL, and based on the defocus amount d and the focal length f of the second optical system CL, the focusing amount x can be highly accurately determined.

By way of example, if the defocus amount d is +10, and when the average value of −1.939 between the focusing amount x of −1.923 at L=141 (Photo-taking magnification $\beta=10$) and the focusing amount x of −1.954 at L=138 (Photo-taking magnification $\beta=0$) is used, the focus control of the second optical system CL can be accomplished in an error of about 15$\mu$. The error of about 15$\mu$ can be accommodated within the depth of field according to a normal photo-taking lens assembly.

From the foregoing, the focusing amount x can be deemed as a function of the focal length f and the defocus amount d, that is:

$$x=G(f, d) \quad (10)$$

In view of the foregoing, the defocus amount/focusing amount data converting means DMDM used in the present invention is so designed that the defocus amount d can be converted into a data corresponding to the focusing amount x of the second optical system CL in the AF converter which varies in a non-linear relation to the defocus amount d.

It is, however, pointed out that a highly accurate focus conrol can be accomplished if, by the provision of a position data outputting means of the second optical system CL, the focusing amount x is determined from the parameters f, d and L with the use of the equation (7).

Hereinafter, a preferred embodiment of the present invention, which embodies various features in FIGS. 1 to 4, will now be described with reference to the accompanying drawings.

Figure 7:
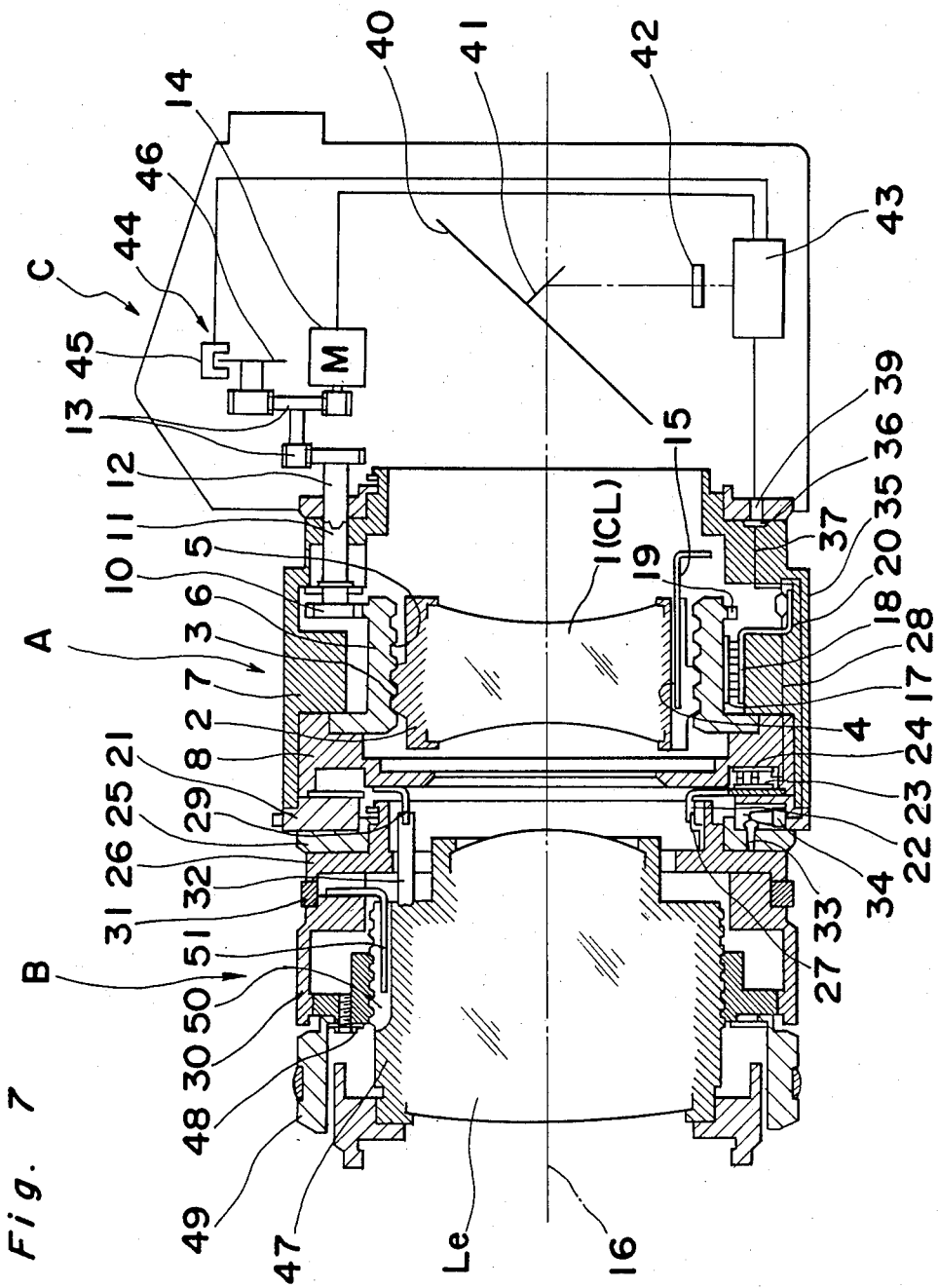
FIG. 7 is a longitudinal sectional view of a photographic camera system embodying the present invention.

Referring first to FIG. 7, the interchangeable lens assembly B is shown as mounted on a camera body C with the AF converter AF positioned between the lens assembly B and the camera body C.

The interchangeable lens assembly B may be either a first photo-taking optical system FPOS adaptable to the full aperture metering and exposure calculating means or a second photo-taking optical system SPOS not adaptable to the full aperture metering and exposure calculating means.

The second optical system CL of the AF converter A is comprised of a plurality of lenses which are referred to as a "converter lens" and generally identified by 1.

A male helicoid barrel 2 carrying the converter lens 1 has its outer peripheral surface formed with a male helicoid 3 and a straight groove 4 formed thereon. A female helicoid barrel 6 having its inner peripheral surface formed with a female helicoid 5 threadably engaged with the male helicoid 3 has one end retained rotatably between a fixed outer barrel 7 and a fixed inner barrel 8, and the other end formed exteriorly with a helicoid gear 9.

A driven coupler 11 having a pinion gear 10 rigidly mounted thereon and engaged with the helicoid gear 9 is rotatably supported by the fixed outer barrel 7 and is engaged with a drive coupler 12 which is in turn drivingly connected with a motor 14 through a drive gear 13.

A straight key 15 protruding from the fixed inner barrel 8 is inserted into the straight groove 4 in the male helicoid barrel 2 for regulating the rotation of the male helicoid barrel 2. Accordingly, when the motor 14 is driven accompanied by the rotation of the female helicoid barrel 6, the male helicoid barrel 2 and the converter lens 1 are moved in a direction parallel to the optical axis 16. In other words, the converter lens 1 can be moved forwards and rearwards in response to the rotation of the motor 14 in first and second directions opposite to each other.

The outer peripheral surface of the female helicoid barrel 6 has a brush assembly 17 bonded thereto and held in sliding engagement with a code plate 18 bonded to the inner peripheral surface of the fixed outer barrel 7. The cord plate 18 generates a signal indicative of the amount of rotation of the female helicoid barrel 6. Since the amount of rotation of the female helicoid barrel 6 corresponds to a current position data Lp (corresponding to the distance L shown in FIGS. 5 and 6) representative of the position of the converter lens 1 along the optical axis, it will readily be understood that the code plate 18 generates an signal representative of the current position data Lp of the converter lens 1.

The code plate 18 is connected through an electroconductor 20 with ROM-IC 19 fitted to the fixed outer barrel 7. ROM-IC 19 is so designed as to specify a particular address on the basis of the current position data Lp of the converter lens 1 outputted from the code plate 18.

A linkage lever 22 adapted to be coupled with a full aperture signalling pin 27 is rotatably supported by a fixed front barrel 21 and positioned between the fixed inner barrel 18 and the fixed front barrel 21 and is normally biased by a spring (not shown) in a counterclockwise direction as viewed from the target object.

A rear face of the linkage lever 22 has a brush assembly 23 bonded thereto and slidingly engaged with a code plate 24 which is bonded to the front face of the fixed inner barrel 8.

A male mount of the interchangeable lens assembly B removably mounted on a female mount 25 secured to the fixed front barrel 21 is formed with the full aperture signalling pin 27.

When the interchangeable lens assembly B is coupled with the AF converter A, the linkage lever 22 can be rotated against the biasing force because of its contact with the full aperture signalling pin 27. As a result thereof, the code plate 24 generates a signal indicative of the amount of rotation of the linkage lever 22, which signal corresponds to the smallest available F-stop number (aperture value) of the interchangeable lens assembly B.

The code plate 24 is connected through an electroconductor 28 with the ROM-IC 19. The ROM-IC 19 is so designed as to specify an address on the basis of a data representative of the smallest available F-stop number of the interchangeable lens assembly B outputted from the code plate 24.

A full aperture setting lever 29 is fixed in the fixed inner barrel 8 of the AF converter A. In the interchangeable lens assembly B, an aperture ring 31 is rotatably mounted between the male mount 26 and the fixed front barrel 30 and is operatively associated with an aperture linkage lever 32 provided in the interchangeable lens assembly B.

When the interchangeable lens assembly B is coupled with the AF converter A, the aperture linkage lever 32 in the interchangeable lens assembly B is engaged with the full aperture setting lever 29, wherefore the aperture linkage lever 32 is rotated to a predetermined position to stop down the aperture ring 31 of the interchangeable lens assembly B to the largest available F-stop number position.

It is to be noted that, where a focus detector (comprised of a photoelectric sensor unit 42 and a microprocessor 43 as will be described later) is of a type capable of working with the F-stop number up to 8, the full aperture setting lever 29 may be so designed as to stop the aperture down to the F-stop number of 8.

An interchangeable lens mounting signalling pin 33 retractably mounted in the female mount 25 is normally biased by a spring force exerted in a microswitch 34. When the interchangeable lens assembly B is coupled with the AF converter A, the signalling pin 33 is retracted to open the microswitch 34. The microswitch 34 is connected with the ROM-IC 19 through an electroconductor 35 and, therefore, when it is opened, an electric power can be supplied from the camera body C to the ROM-IC 19.

A rear end of the fixed outer barrel 7 of the AF converter A is provided with a signalling contact 36 which is electrically connected with the ROM-IC 19 through an electroconductor 37. A front ring 38 of the camera body C is provided with a signalling pin 39 which is, when the AF converter A is coupled with the camera body C, connected with the signalling contact 36.

Figure 1:
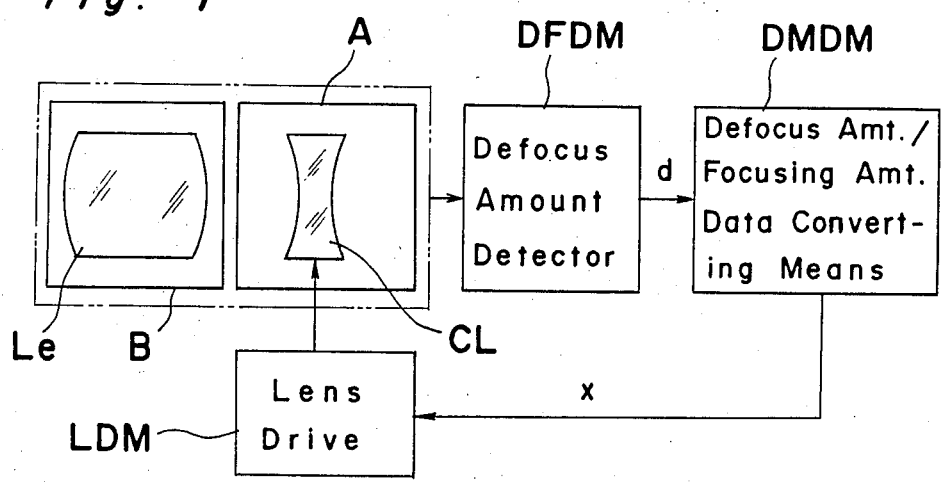
FIGS. 1 to 4 are schematic diagrams summarizing various features of the present invention.

The camera body C is provided therein with a beamsplitting, semitransparent mirror 40, an auxiliary mirror 41, the photoelectric sensor unit 42 including a pupil separating optical system and a charge-coupled device, the microprocessor 43 capable of performing necessary calculations for the focus detection and the focus control, and an pulse encoder 44.

the semitransparent mirror 40, the auxiliary mirror 41, the photoelectric sensor unit 42 and a calculating section of the microprocessor 43 for the focus detection altogether correspond to the defocus amount detecting means DFDM shown in FIG. 1.

The microprocessor 43 is connected with the signalling pin 39, the photoelectric sensor unit 42, the motor 14 and an photointerrupter 45 of the pulse encoder 44. The pulse encoder 44 includes a slit plate 46.

The motor 14 corresponds to the lens drive means LDM for the second optical system CL shown in FIG. 1.

The interchangeable lens assembly B includes, among other component parts, a male helicoid barrel 47 carrying the first optical system Le, a female helicoid barrel 48, an operating ring 49 for moving the female helicoid barrel 48, a straight groove 50 and a straight key 51.

The structure of the microprocessor 43 will now be described with particular reference to FIG. 8.

Figure 8:
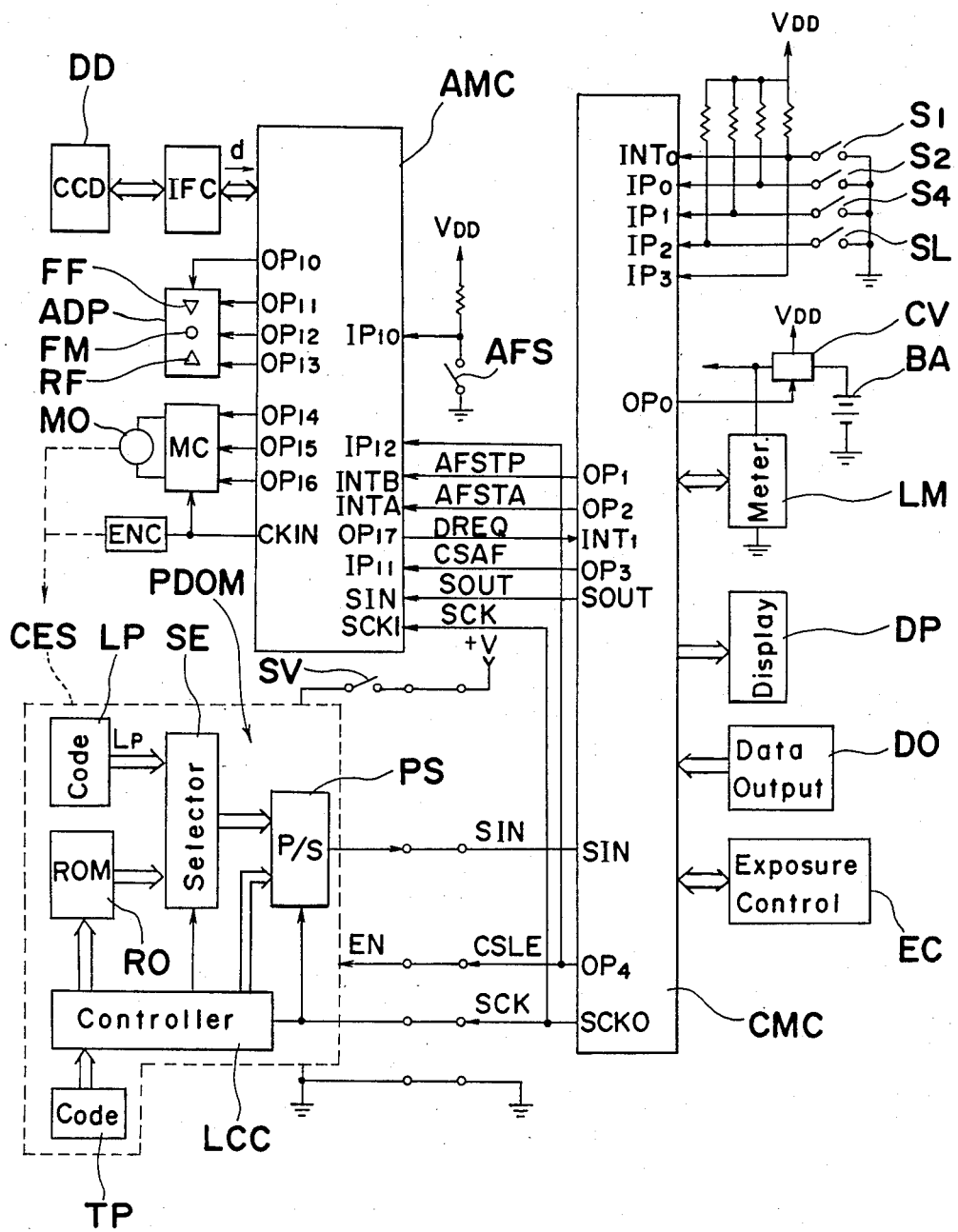
FIG. 8 is a circuit block diagram showing a control circuit used in the photographic camera system.

Referring to FIG. 8, reference character CMC represents a microcomputer capable of governing an exposure control, a data transfer control, a power supply control and a sequence control of a camera system. This microcomputer CMC will be hereinafter referred to as "computer" for the sake of brevity.

Reference character S1 represents a light measuring switch capable of being closed upon the first-stage depression of a release button (not shown). Reference character S2 represents a release switch capable of being closed upon the second-stage depression of the release button.

When the light measuring switch S1 is closed, an interruption signal is fed to an interruption terminal INTo of the computer CMC to drive the computer CMC, which has been held inoperative, accompanied by the start of operation of the camera system as a whole. On the other hand, when the release switch S2 is closed, an exposure control operation of the camera is initiated.

Reference character S4 represents a safety switch capable of being closed at the time of completion of the exposure control operation and being opened at the time of completion of both of a film winding and a charging of an exposure control mechanism. Reference character SL represents a mount switch capable of being closed when the interchangeable lens assembly B or any other adaptor is mounted on a lens mount area of the camera body C.

Reference character BA represents one or more batteries providing a source of electric power required by the camera system as a whole. Reference character CV represents a power supply control circuit controllable by a signal fed from an output port OPo of the computer CMC. This power supply control circuit CV constantly feeds a power source line $V_{DD}$ with an electric power and, only when the output port OPo is in a low level state, feeds a power source line +V with an electric power.

It is to be noted that through the power source line +V an electric power is supplied to a light measuring unit LM, a convertor circuit CEC, an interface circuit IFC, an encoder ENC (≡pulse encoder 44) and an exposure control circuit EC. The remaining circuits are fed with an electric power through the power source line $V_{DD}$.

The light measuring unit LM is comprised of a light measuring circuit and an analog-to-digital convertor. Reference character DP represents a display unit for displaying exposure control data and others, and reference character DO represents a data output unit for outputting exposure control data including, for example, a film speed and others. The exposure control circuit EC performs an exposure control on the basis of data such as, for example, an aperture value and an exposure time, fed from the computer CMC.

The computer CMC has functions of inputting and outputting a serial data, and the serial data inputting function governs the inputting of data from the interchangeable lens assembly or the AF converter A. The serial data outputting function of the computer CMC governs the outputting of data to an AF-purpose microcomputer AMC.

Reference character SV represents a switch capable of being closed only when an interchangeable lens assembly B having no AF function, that is, an outdated interchangeable lens, is coupled with the AF converter A. This switch SV corresponds to the microswitch 34 shown in FIG. 7.

The convertor circuit CEC shown by the phantom line in FIG. 8 governs a data outputting occurring within the AF convertor A. Reference character LP represents a code plate for outputting the current position data Lp indicative of the position of the convertor lens 1. This code plate LP corresponds to the code plate 18 shown in FIG. 7 and constitutes a part of the current position data outputting means PDOM referred to in the present invention.

Reference character TP represents a code plate for outputting the data indicative of the full aperture value of the interchangeable lens assembly B, coupled with the AF convertor A, which is transmitted through the signalling member representative of the full aperture value. This code plate TP corresponds to the code plate 24 shown in FIG. 7.

It is to be noted that the signalling member referred to above may be the amount of projection of a pin, or the distance of spacing from a reference position of the pin when the interchangeable lens assembly B is completely mounted, or a signalling member provided in an aperture value setting member such as the aperture ring 31. In the case of the aperture value setting member, it generates a signal indicative of a preset aperture value, not the full aperture value.

Reference character RO represents a read-only memory (ROM) in which various data are fixedly stored. This read-only memory RO is provided within the ROM-IC 19 shown in FIG. 7.

In the read-only memory RO, the relationships between the stored data and addresses are such as shown in Table 3.

TABLE 3

| AF Convertor For Use With Old Lens Assemblies | |
|---|---|
| Address | Data |
| 00H | Convertor Check Data 80H |
| 01H | **H |
| 02H | **H |
| 03H | **H |
| 04H | **H |
| 10H~ | AF-purpose Aperture Value Data AFAvo |
| 1FH | (Full aperture value or preset aperture value of the mounted interchangeable lens assembly) |
| 20H | Focusing Amount → Motor Rotational Amount Conversion Coefficient $k_D$ |
| 21H | **H |
| 22H | Output Lo of Code Plate LP when the convertor lens is at the closest limit position |
| 23H | Output Lmax of Code Plate LP when the convertor lens is at the farthest limit position |

H: Hexadecimal numbering system
**H: Superfluous
Note: "k" of $k_D$ should be a low case character As can be understood from Table 3, the read-only memory RO stores a position data $L_{max}$ descriptive of the position of limit to forward side shifting of the second optical system CL of the AF convertor A and a position data Lo descriptive of the position of limit to rear side shifting of the second optical system of the AF convertor A. That is, the read-only memory RO constitutes a part of the limit position data outputting means EDOM referred to in the present invention.

The relationships between the data stored in the read-only memory RO and the addresses applicable to the updated interchangeable lens assembly having a fixed focal length and that having a variable focal length, both of which are manufactured for use with the automatic focusing device of the present invention, are shown in Tables 4 and 5, respectively.

TABLE 4

New Lens Assemblies of Fixed Focal Length

| Address | Data |
|---|---|
| 00H | Lens Check Data 88H |
| 01H | Full Aperture Value Avo |
| 02H | Largest Available Aperture Value Avmax |
| 03H | 00H |
| 04H | Focal Length fv |
| 05H | AF-purpose Aperture Value Data AFAvo (=Avo) |
| 06H | Defocus Amt → Motor Rotational Amt Conversion Coefficient $K_D$ |
| 07H | **H |
| 08H | **H |
| 09H | **H |

H: Hexadecimal numbering system
**H: Superfluous
Note: "K" of $K_D$ should be an upper case character

TABLE 5

New Lens Assemblies of Variable Focal Length

| Address | Data |
|---|---|
| 00H | Lens Check Data 88H |
| 01H | Full Aperture Value Avo at shortest focal length |
| 02H | Largest Available Aperture Value Avmax at longest focal length |
| 10H~1FH | Amount of change ΔAvz in aperture value between the shortest and longest focal length settings |
| 05H~2FH | Preset Focal Length fv |
| 30H | Full Aperture Value which is largest at all focal length settings, AF-purpose Aperture Value Data AFAvo |
| 05H~2FH | Defocus Amt → Motor Rotational Amt Conversion Coefficient $K_D$ according to Focal Length |
| 50H | **H |
| 51H | **H |
| 52H | **H |

H: Hexadecimal numbering system
**H: Superfluous
Note: "K" of $K_D$ should be an upper case character As can be seen from these tables, the camera body C can read ten kinds of data. That is, the computer CMC cyclically performs the serial inputting and outputting operations ten times while rendering a signal line CSLE connected with an output port OP4 to be in "L" level. At the time of each cycle of the serial inputting and outputting operation, 8 clocks are supplied from a clock output terminal SCO to a controller LCC of the convertor circuit CEC. In synchronism with this clock signal, parallel data fed from a selector SE are converted into serial data by a parallel-to-serial convertor circuit PS and are transferred to the computer CMC within the camera body C.

The controller LCC counts the clocks and specifies the addresses in the order given in Table 2. Subsequent to the address 04H, the upper four bits specifies an address 1H on the basis of the counted data, and the lowest four bits outputs the data from the code plate TP. Then, only one address is specified out of the addresses 10H to 1FH, and the AF-purpose aperture value data AFAvo associated with the full aperture value or preset aperture value of the interchangeable lens assembly B coupled with the AF convertor A is outputted.

Where the interchangeable lens assembly B having provided therein no member for transmitting the data of the full aperture value or preset aperture value is coupled with the AF convertor A, arrangement can be made that the same data as that outputted when the lens assembly of highest available lens speed is mounted is outputted from the code plate TP so that the data of AFAvo necessary to perform the focus detecting operation can be transferred. With this arrangement, any erroneous operation may occur when the lens assembly of a lens speed too low for the focus detecting operation to be performed. However, nothing appears better than this arrangement.

In the event that an address 21H is specified, the controller LCC feeds to the selector SE a signal necessary to cause the selector SE to output the data from the code plate LP. Only in this case, the selector SE outputs the current position data Lp of the convertor lens 1 from the code plate LP, not the data stored in the read-only memory RO.

When the transfer of data at respective addresses 22H and 23H completes subsequently, the computer CMC ceases its serial inputting and outputting operation, rendering the signal line CSLE to be in "H" level thereby to interrupt the operation of the convertor circuit CEC.

Although the details of the lens assembly of fixed focal length and that of variable focal length (zoom lens assembly) are not illustrated nor tabulated in any tables, an intermediate accessory (new convertor) which can perform an automatic focusing operation as well as an aperture control acceptable to the novel camera system and which is used as mounted between the camera body and the new lens assembly of the AF convertor is disclosed in, for example, the Japanese Laid-open Patent Publications No. 59-084228, No. 59-188622, No. 59-188609, No. 59-093410, and No. 59-140408 and, therefore, is not herein described for the sake of brevity.

The code plate LP, the controller LCC, the read-only memory RO, the selector SE and the parallel-to-serial convertor circuit PS altogether correspond to the mounted optical system detecting means ODM referred to in the present invention, which detecting means ODM is capable of detecting whether the first photo-taking optical system FPOS adaptable to the full aperture metering and exposure calculating means OMEOM is mounted, or whether the second photo-taking optical system SPOS inadaptable to the full aperture metering and exposure calculating means OMEOM is mounted, or whether none of these first and second photo-taking optical systems FPOS and SPOS is mounted.

Reference character AMC represents a microcomputer for use in automatic focus adjustment. Hereinafter, this microcomputer AMC is simply referred to as "AF-purpose microcomputer" for the sake of brevity. Reference character DD represents a charge-coupled device for detecting the distribution of brightness of the target object delivered from two pupils of the photo-taking optical system. The optical system for projecting light onto this charge-coupled device DD is disclosed in, for example, the Japanese Laid-open Patent Publications No. 60-031109 and No. 60-032014 and, therefore, the details thereof will not be described herein for the sake of brevity.

Reference character IFC represents an interface circuit operable to drive the charge-coupled device DD on the basis of a control signal fed from the AF-purpose microcomputer AMC and to transfer a data of each photoelectric element (pixel) to the AF-purpose microcomputer AMC after the analog-to-digital conversion of such data. The details of the interface circuit IFC are disclosed in, for example, the Japanese Laid-open Patent Publications No. 59-126517 and No. 59-140408 and, therefore, are not herein described for the sake of brevity.

Reference character ADP represents a display unit for displaying a focus condition. This display unit ADP is operable to light a front focus indicator FF when an output port OP11 is in an "L" level state, to light an in-focus indicator FM when an output port OP12 is in an "L" level state, to light a rear focus indicator RF when an output port OP13 is in an "L" level state, and to blink either the front focus indicator FF or the rear focus indicator RF when an output port OP10 is in an "L" level state.

This focus condition display unit ADP causes either the front focus indicator FF or the rear focus indicator RF to blink in the event that a decision done preparatory to the movement of the convertor lens 1 for focus adjustment results in that an in-focus condition cannot be attained even though the convertor lens 1 is moved for focus adjustment. In this case, a photographer viewing the indicator then blinking can learn the direction in which the first optical system Le of the interchangeable lens assembly has to be manually moved for focus adjustment.

In other words, a means of the display unit ADP corresponding to this function corresponds to the first optical system moving direction display means FMDDM referred to in the present invention.

Reference character MC represents a motor control circuit for controlling a motor MO (≡motor 14) for driving the convertor lens 1. This motor control circuit MC control the motor MO so as to move the convertor lens 1 from a front focus position towards an in-focus position when an output port OP14 is in a "L" level state. Moreover, this motor control circuit MC controls the motor MO so as to move the convertor lens 1 from a rear focus position towards the in-focus position when an output port OP15 is in an "L" level state, brakes the motor MO so as to bring the convertor lens 1 quickly to a halt when both of the output ports OP14 and OP15 are in an "L" level state and render the motor MO inoperative when both of the output ports OP14 and 15 are in a "H" level state.

Moreover, the motor control circuit MC is also operable to drive the motor MO at a high speed when an output port PO16 is in a "H" level state and at a low speed when the output port PO16 is in an "L" level state.

It is to be noted that a means in the motor control circuit MC for governing a function of driving the motor MO at a high speed, and the motor MO itself altogether correspond to the second optical system drive means SDM referred to in the present invention.

A rotational force of the motor MO can be transmitted to the new interchangeable lens assembly, the new convertor, and/or the AF convertor through a suitable transmission mechanism such as disclosed in, for example, the Japanese Laid-open Patent Publications No. 59-140408 and No. 59-093410.

The amount of rotation of the motor MO is monitored by the encoder ENC and generates a train of pulse corresponding in number to the amount of rotation thereof to the new interchangeable lens assembly, the new convertor or the AF convertor.

The pulse train from the encoder ENC is fed to the motor control circuit MC for controlling the speed of rotation of the motor MO and is also fed to a clock input terminal SCK1 of the AF-purpose microcomputer AMC.

A presettable event counter ECO (not shown) built in the AF-purpose microcomputer AMC is used for presetting an expected amount N of rotation of the motor MO and the count thereof is decremented by one each time a pulse is inputted to the clock input terminal SCK1. When the count of the presettable event counter ECO becomes zero, a counter interruption is latched and the AF-purpose microcomputer AMC executes an interruption process.

A switch AFS connected with the AF-purpose microcomputer AMC is adapted to be closed when an automatic focus adjusting mode (AF-mode) is selected and opened when a manual focus adjusting mode (FA-mode) is selected.

When the level of a signal line AFSTA sets down to an "L" level state, an interruption is latched at the interruption terminal INTA of the AF-purpose microcomputer AMC with the result that the AF-purpose microcomputer AMC starts its operation. On the other hand, when the level of a signal line AFSTP sets down to an "L" level state, an interruption is latched at an interruption terminal INTB of the AF-purpose microcomputer AMC with the result that, after the execution of a predetermined operation, the AF-purpose microcomputer AMC is rendered inoperative.

When a signal line DREQ connected with an output port OP17 is rendered in an "L" level state, an interruption signal is fed to an interruption terminal $INT_1$ of the control computer CMC with the result that necessary data can be serially transferred from the control computer CMC to the AF-purpose microcomputer AMC. That is, the signal line CSAF is used to transfer the necessary data in a seriated manner from the control computer CMC to the AF-purpose microcomputer AMC when it is rendered in an "L" level state.

For the purpose of this data transfer, a serial input terminal SIN of the AF-purpose microcomputer AMC is connected with a serial output terminal SOUT of the control computer CMC. In addition, the sync clock input terminal SCKI of the AF-purpose microcomputer AMC is connected with a sync clock output terminal SCKO of the control computer CMC.

Comparing the present invention with the above described construction, the charge-coupled device DD and the AF-purpose microcomputer AMC altogether correspond to the focusing amount calculating means PMCM.

In addition, the code plate LP (≡code plate 18), the selector SE and the parallel-to-serial convertor circuit PS altogether correspond to the current position data outputting means PDOM for outputting the current position data Lp of the second optical system (≡convertor lens 1).

Moreover, the light measuring unit LM, the data outputting unit DO and the control computer CMC altogether correspond to the full aperture metering and exposure calculating means OMEOM and also to the actual aperture metering and exposure calculating means RMEOM.

The control computer CMC itself corresponds to the control means CONT operable to drive both of the automatic focus adjusting means FDM and the full aperture metering and exposure calculating means OMEOM on the basis of the detection of the mounting of the first photo-taking optical system FPOS by the mounted optical system detecting means ODM, to drive both of the automatic focus adjusting means FDM and the actual aperture metering and exposure calculating means RMEOM on the basis of the detection of the mounting of the second photo-taking optical system SPOS by the mounted optical system detecting means ODM, and to render the automatic focus adjusting means FDM inoperative and drive the actual metering and exposure calculating means RMEOM on the basis of the detection of non-mounting by the mounted optical detecting means ODM.

Operation Of Control Computer CMC

Figure 9:
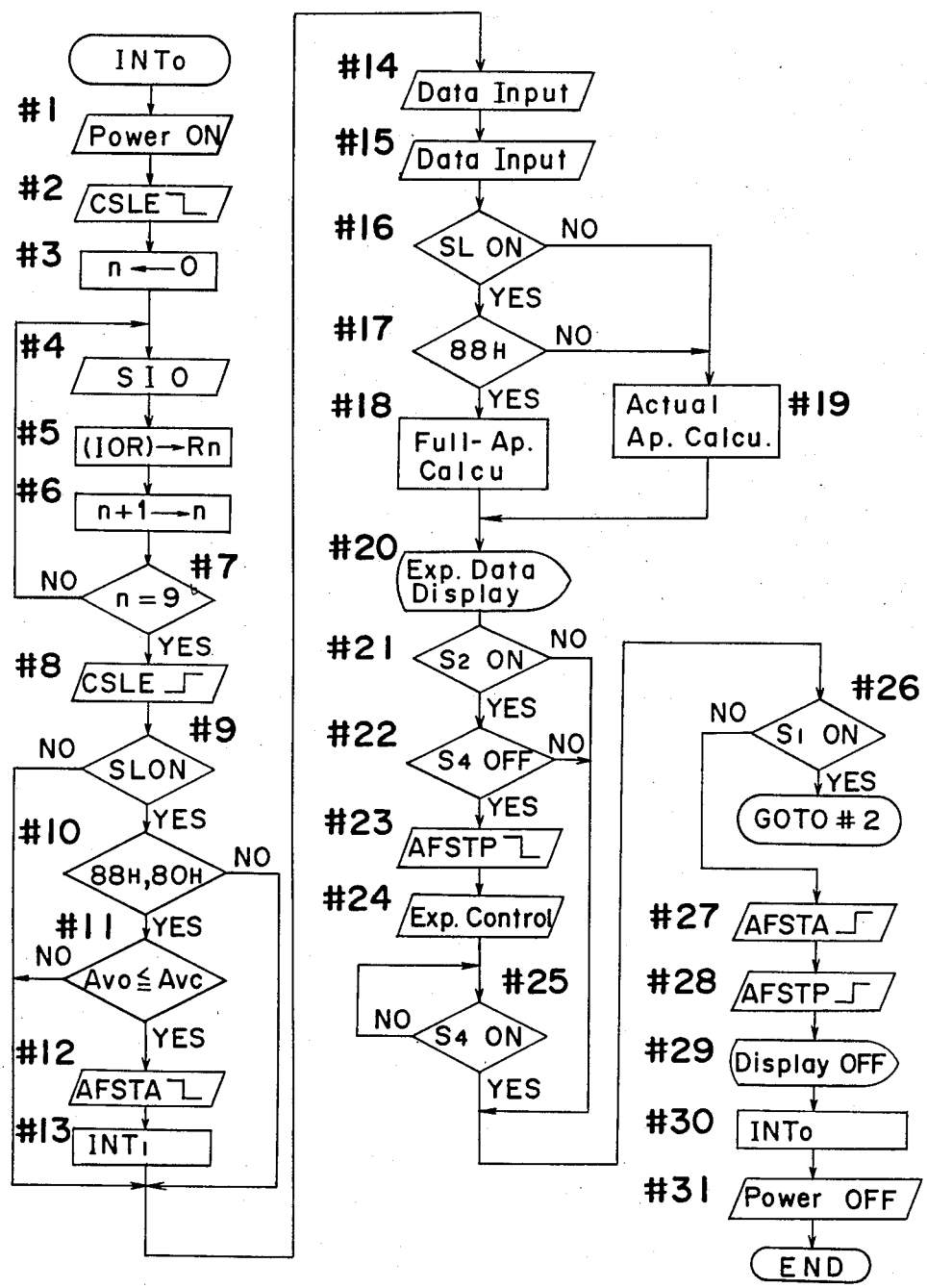
FIG. 9 is a flowchart showing the sequence of control performed by a microcomputer.

The operation of the control computer CMC will now be described with reference to a flowchart shown in FIG. 9.

When the light measuring switch S1 is closed as a result of the first-stage depression of the release button, the interruption signal is applied to an interruption terminal INTo of the control computer CMC to drive the latter.

At step #1, the power supply control circuit CV is operated to effect the supply of an electric power through the power source line +V. At the subsequent step #2, the signal line CSLE connecting the control computer CMC with the convertor circuit CEC is rendered in an "L" level state, resulting in that the convertor circuit CEC of the AF convertor A (or a lens circuit of the interchangeable lens assembly then mounted) is brought in an active condition.

At step #3, the content of a register n in the computer CMC is reset to zero (i.e., initialized), followed by the execution of the serial inputting and outputting operation SIO at step #4.

In this way, the data read in the serial input and output register IOR of the computer CMC is set in a register Rn (wherein n=0) of the computer CMC at step #5. At step #6, the content of a register n is incremented by one.

At step #7, a decision is made to determine if the content of the register n becomes "9". If the result of the

TABLE 6

| Registers | Data |
| --- | --- |
| Ro | 80H or 88H |
| R1 | Avo |
| R2 | Avmax |
| R3 | $\Delta$Avz |
| R4 | fv |
| R5 | AFAvo |
| R6 | $K_D$ or $k_D$ |
| R7 | Lp |
| R8 | Lo |
| R9 | Lmax |

In other words, the data perculiar to the AF convertor A which is stored in the read-only memory RO of the AF convertor A is transferred to the computer CMC.

For the purpose of the description of the present invention, a lens system provided with both of the automatic focusing device and the full aperture metering and exposure calculating means according to the present invention is referred to as a "new lens system", and any interchangeable lens assembly and any convertor both adaptable to the full aperture metering and exposure calculating means provided in the computer CMC in this new lens system are respectively referred to as a "new lens assembly" and a "new convertor". Examples of the new lens assemblies include such lens assemblies of fixed focal length and lens assemblies of variable focal length as listed in Tables 4 and 5, respectively.

Also, any interchangeable lens assembly inadaptable to both of the automatic focusing device and the full aperture metering and exposure calculating means provided in the computer CMC of the new lens system is referred to as an "old lens assembly", examples of which include such as listed in Table 3.

The AF convertor A shown in FIG. 7 is used for enabling an old lens assembly inadaptable to the automatic focusing device of the new lens system to be useable in the automatic focusing, and this type of convertor has been, and is, referred to as the "AF convertor".

TABLE 7

| Mounted Lens System | New Lens System | | | Old Lens System | | |
| --- | --- | --- | --- | --- | --- | --- |
| | New Lens Assembly | New Lens Assembly + New Convertor | New Convertor | Old Lens Assembly + AF Convertor | AF Convertor | Non-mounted |
| Ro | 88H | 88H | **H | 80H | **H | **H |
| R1 | Avo | Avo | **H | **H | **H | **H |
| R2 | AVmax | Avmax | **H | **H | **H | **H |
| R3 | $\Delta$Avz | $\Delta$Avz | **H | **H | **H | **H |
| R4 | fv | fv | **H | **H | **H | **H |
| R5 | AFAvo | AFAvo | **H | AFAvo | **H | **H |
| R6 | $K_D$ | $K_D$ | **H | $k_D$ | **H | **H |
| R7 | **H | **H | **H | $Lp^1$ | **H | **H |
| R8 | **H | **H | **H | Lo | **H | **H |
| R9 | H | H | H | Lmax | H | **H | decision indicates that the content of the register n has not bet attained "9", the program flow returns to step #4, repeating the program flow from step #4 to step #6 until the content of the register n becomes "9". When the content of the register n becomes "9", the signal line CSLE is rendered in an "H" level state at step #8, bringing the convertor circuit CEC (or the lens circuit) in a disabled condition. As a result thereof, the respective data set in registers Ro to R9 represent such as tabulated in Table 6.

A combination of the old lens assembly underlined in Table 7 with the AF convertor also underlined in Table 7 is what has been shown in FIG. 7.

As shown in Table 7, if the photo-taking lens assembly mounted on the camera body C is a new lens assembly adaptable to the new lens system or a combination of a new lens assembly with the AF convertor, a check data 88H is set in the register Ro.

If the photo-taking lens assembly mounted on the camera body C is a combination of the AF convertor A with the old lens assembly inadaptable to the new camera system (that is, the old lens system), a check data 80H is set in the register Ro.

In the case of the new lens system, such data as shown in Table 6 are set in the register R1 to R9, whereas in the case of the old lens system, data of **H are set therein.

In the case of the new lens system, a data AFAvo (≡ full aperture value AVo) representative of an AF-purpose aperture value is set in the register R5 if the lens assembly used is the new lens assembly of fixed focal length, and a data AFAvo representative of the smallest aperture value at all of the focal lengths is set in the register R5 if the lens assembly used is the new lens assembly of variable focal length. In the case of the old lens system, the full aperture value or preset aperture value of the interchangeable lens assembly B used is set in the register R5 as a data AFAvo representative of the AF-purpose aperture value.

In the register R6, in the case of the new lens system, a conversion coefficient $K_D$ necessary to convert the defocus amount d into the amount N of rotation of the motor MO necessary to move the convertor lens assembly 1 to the in-focus position is set.

However, in the case of the old lens, the focusing amount x necessary to move the convertor lens assembly 1 to the in-focus position is determined by such a means as will be described later, which means may be considered constituting a nucleus of the present invention.

Another conversion coefficient $k_D$ necessary to convert the focusing amount x once determined into a data of the amount N of rotation of the motor MO necessary to move the convertor lens assembly 1 to the in-focus position is set in the register R6.

In the register R7, R8 and R9, in the case of the new lens system, respective data of **H are set and, in the case of the old lens system, the current position data Lp of the convertor lens assembly 1 system, a position data Lo representative of the closest position at which the convertor lens assembly 1 is moved closest to the camera body C, and a position data Lmax representative of the remotest position at which the convertor lens assembly 1 is moved farthest from the camera body C are set.

It is to be noted that, where only the new convertor is used, a non-mounted condition is established since the new convertor is so designed as to convert the data from the new lens assembly and then to transfer them to the camera body as disclosed in the previously mentioned patent literatures. Also, where only the AF convertor is used, since the switch SV is opened, no electric power is supplied to the convertor circuit CEC and, therefore, a condition similar to that established when no lens assembly is mounted, that is, during the non-mounted condition, is established. Moreover, since only the old lens assembly itself is not acceptable to the mount area, it cannot be coupled with the camera body.

In the manner as hereinabove described, up until the step #8, the peculiar lens data stored in the read-only memory RO are completely read out.

At step #9, a decision is made to determine if the switch SL is closed. Where the switch SL is opened, it means that no photo-taking lens assembly is coupled with the camera body C and, therefore, the program flow proceeds to step #14.

Where the switch SL is closed, it means that the photo-taking lens assembly is mounted, i.e., coupled with the camera body C, and, therefore, the subsequent decision step #10 takes place at which a decision is made to determine if the check data 88H or 80H has been read in. In other words, the decision is such as to determine if the photo-taking lens so mounted is the one adaptable to the automatic focusing device and the full aperture metering and exposure calculating means.

Where either of these data has been read in, another decision is made at step #11, but where neither of these data has been read in, the program flow proceeds to step #14.

It is to be noted that where only the convertor of the new lens system (that is, the new convertor or the AF convertor) is mounted, or where a photo-taking lens system having a mount compatible with the mount area of the camera body C and having no signal transmission function is eventually manufactured and is subsequently mounted on the camera body C, neither of the check data 88H and 80H is read in while the switch SL is closed.

It is also to be noted that the program flow from step #3 to step #9 corresponds to the mounted optical system detecting means ODM referred to in the present invention.

On the other hand, where the check data 88H or 80H has been read in, the decision step #11 takes place to determine if the AF-purpose aperture value data AFAvo is equal to or smaller than a predetermined aperture value Avc.

If the data AFAvo is greater than the predetermined aperture value Avc, a light receiving area of the charge-coupled device is shaded by the aperture to such an extent as to result in inaccurate focus detection and, therefore, the program flow proceeds to step #14.

On the other hand, if the data AFAvo is equal to or smaller than the predetermined aperture Avc, an accurate focus detection is possible and, therefore, the next succeeding step #12 is assumed.

At step #12, the signal line AFSTA is rendered in an "L" level state to enable the AF-purpose microcomputer AMC to operate. At step #13, an interruption signal is permitted to the interruption terminal $INT_1$ of the computer CMC, followed by step #14.

At step #14, a data of $[Bv-(Avo+\Delta Avz)]$ (wherein Bv represents the brightness of the target object) is inputted as a measured light data fed from the light measuring unit LM, and at step #15, an exposure control data is inputted from the exposure control data outputting unit DO, followed by step #16.

At step #16, a decision is made to determine if the switch SL is closed. When the switch SL is closed, the next succeeding step #17 is assumed, but when it is opened, the program flow proceeds to step #19.

At step #17, a check is made of the check data. If the check data 88H has been read in, it means that the first photo-taking optical system FPOS adaptable to the full aperture metering and exposure calculating means OMEOM is mounted and the aperture control according to the new lens system is possible, the program flow proceeds to step #18 at which a full aperture metering and exposure calculation is executed.

The program flow from step #14 to step #15 and the step #18 altogether correspond to the full aperture metering and exposure calculating means OMEOM referred to in the present invention.

On the other hand, if the check data 80H has been read in, it means the old lens system, that is, it means that the second photo-taking optical system SPOS inadapatable to the full aperture metering and exposure calculating means OMEOM is mounted and the aperture control is impossible, and therefore, the program flow proceeds to step #19 at which an actual aperture metering and exposure calculation is executed.

Even where neither of the check data 88H and 80H is read in, the step #19 takes place.

The program flow from step #14 to step #15 and the step #19 altogether constitute the actual aperture metering and exposure calculating means RMEOM referred to in the present invention.

Also, the steps #10 and #17 altogether correspond to the control means CONT referred to in the present invention, and the program flow from step #11 to step #13 corresponds to the automatic focus adjusting means FDM referred to in the present invention.

During the full aperture metering and calculation performed at step #18, the following calculation is performed on the basis of the measured light data to determine an exposure value data Ev and to determine both of an aperture value data Av and an exposure time data Tv from the calculated exposure value data Ev:

Since $Bv-(Avo+\Delta Avz)$, $$Ev=[Bv-(Avo+\Delta Avz)]+(Avo+\Delta Avz)+Sv$$

wherein Bv represents a data on the brightness of the target object, Ev represents a data on the exposure value, Sv represents a data on the film speed, and Tv represents a data on the exposure time.

On the other hand, during the actual aperture metering and calculation performed at step #19, since the measured light data is represented by $Bv-Av$, wherein Av represents an actual aperture value data of the photo-taking lens system, the following calculation is performed to determine the exposure time data Tv while the aperture value data Av is represented by a preset aperture value of the photo-taking lens system:

$$Tv=(Bv-Av)+Sv$$

After the completion of the step #18 or #19, the program flow proceeds to step #20 at which the display unit DP for the display of the exposure control data and others is driven to display the exposure control data calculated at step #18 or #19.

Subsequently and at step #21, a decision is made to determine if the release switch S2 is closed. If the switch S2 is not closed, the program flow proceeds to step #26, but if the switch S2 is closed, the program flow proceeds to step #22 at which another decision is made to determine if the safety switch S4 is opened. The safety switch S4 is opened at the time of completion of the charging of the exposure control mechanism. However, if the result of the decision at step 22 indicates that the safety switch S4 is not opened, the program flow proceeds to step #26, but if it indicates that the safety switch S4 is closed, the program flow proceeds to step #23.

At step #23, the signal line AFSTP is rendered in an "L" level state to bring the AF-purpose microcomputer AMC to a halt. Subsequently and at step #24, the exposure control operation is executed by the exposure control unit EC, followed by a wait condition at step #25 which continues until the safety switch S4 is closed.

When the safety switch S4 is closed, a decision is made at step #26 to determine if the light measuring switch S1 is closed.

If the result of decision at step #21 indicates that the release switch S2 is closed, and the result of decision at step #26 subsequently indicates that the light measuring switch S1 is closed, the program flow returns to step #2, repeating the reading, calculation and displaying of the previously described data.

However, if the result of decision at step #21 indicates that the release switch S2 is opened, the decision is made at step #26 to determine if the light measuring switch S1 is closed. In the case where the light measuring switch S1 is opened, too, it means that there is no intention to take a photographic picture of the target object and, accordingly, the program flow proceeds to step #27.

At step #27, the signal line AFSTA is rendered in a "H" level state and, at step #28, the signal line AFSTP is rendered in an "L" level state and then, after a predetermined time, in a "H" level state. In this way, when the program flow proceeds to step #28 while the AF-purpose microcomputer AMC is held in the active condition, the AF-purpose microcomputer AMC is forcibly brought to a halt.

Then, at step #29, the display unit DP for the exposure control data and others are disabled to cease the display of the data. After a condition has been set up wherein the interruption signal is permitted to enter the interruption terminal INTo of the computer CMC at step #30, the power supply control circuit CV is brought to a halt at step #31 to cease the supply of the electric power through the power source line +V. In this way, the computer CMC ceases its operation. That is say, by automatically cutting off the power source, any possible waste of electric power is avoided.

Interruption Subroutine

Figure 10:
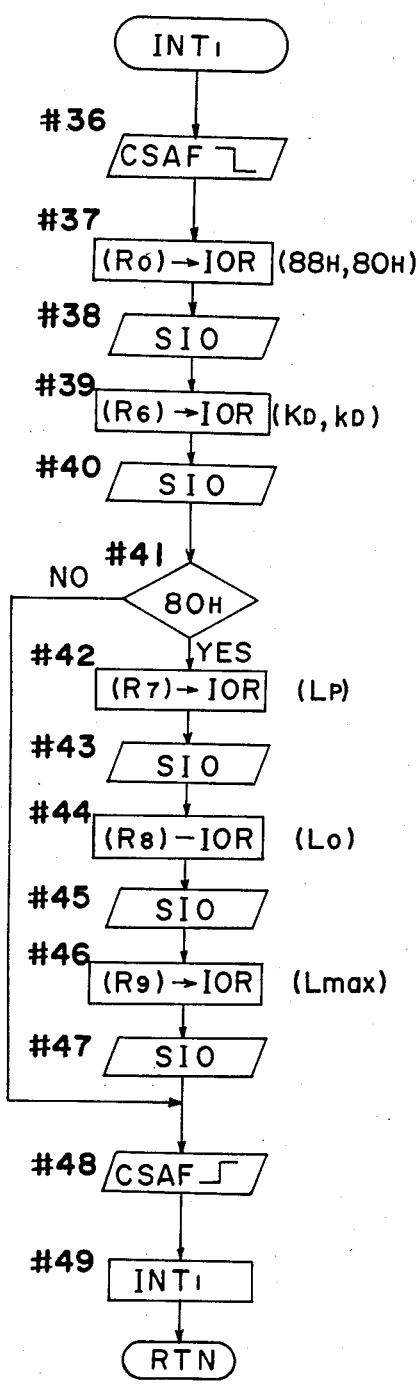
FIG. 10 is a flowchart showing an $INT_1$ interruption subroutine.

When the interruption signal is applied to the interruption terminal $INT_1$ from the AF-purpose microcomputer AMC while the computer CMC repeatedly executes the reading, calculating and displaying of the previously described data, the computer CMC executed such a program flow which is shown in FIG. 10 and which will now be described.

At step #36, the signal line CSAF is rendered in an "L" level state and, at step #37, the content (check data) of the register Ro is set in the serial input and output register IOR, followed by step #38 at which the serial inputting and outputting operation SIO is executed relative to the AF-purpose microcomputer AMC.

Then, at step #39, the content (the motor rotational amount conversion coefficient $K_D$ or $k_D$ of the register R6 is set in the serial input and output register IOR, and at step #40, the serial inputting and outputting operation SIO is executed relative to the AF-purpose microcomputer AMC to deliver the conversion coefficient $K_D$ or $k_D$ to the AF-purpose microcomputer AMC.

At step #41, a decision is made to determine if the AF converter A is an AF converter based on the old lens system, that is, if the content of the register Ro is the check data 80H. If the result of decision at step #41 indicates that the content of the register Ro is not the check data 80H, the program flow proceeds to step #48, but if it indicates that the content of the register Ro is the check data 80H, the step #42 takes place. At subsequent steps #42 to #47, the current position data Lp of the convertor lens assembly 1 in the case of the old lens system, the data Lo on the position of limit to rear side shifting of the convertor lens assembly 1 towards the camera body C, and the data Lmax on the position of limit to forward side shifting of the convertor lens assembly 1 away from the camera body C are deposited in the respective registers R7, R8 and R9 and are then supplied to the AF-purpose microcomputer AMC.

The current position data Lp, the rear side shifting limit position data Lo and the forward side shifting limit position data Lmax are supplied at steps #42 and #43, at steps #44 and #45 and at steps #46 and #47, respectively.

Subsequently, at step #48, the signal line CSAF is rendered in a "H" level state and, after the inputting of the interruption signal to the interruption terminal INT$_1$ has been permitted at step #49, the program flow return to the step at which the interruption has been latched.

It is to be noted that, during the reading of the data from the photo-taking lens system, no interruption signal is applied from the AF-purpose microcomputer AMC to the interruption terminal INT$_1$ of the computer CMC.

The foregoing is the explanation of the operation of the computer CMC. The relationships between the type of the photo-taking lens system, and the absence or presence of the focus detection, the full aperture metering and the actual aperture metering are illustrated in Table 8 below.

TABLE 8

| Mounted Lens System | Focus Detection | Metering System |
|---|---|---|
| New Lens System | | |
| New Lens Assembly | Yes | Full Aperture |
| New Lens Assembly + New Convertor | Yes | Full Aperture |
| New Convertor | No | Actual Aperture |
| Old Lens System | | |
| Old Lens Assembly + AF Convertor | Yes | Actual Aperture |
| AF Convertor | No | Actual Aperture |
| Non-mounted | No | Actual Aperture |

A combination of the old lens assembly underlined in Table 8 with the AF convertor also underlined in Table 8 is the one which is shown in FIG. 7.

It is to be noted that, when only the AF convertor A shown in FIG. 7 is mounted on the camera body C with the switch SV consequently opened, the convertor circuit CEC is in an inoperative condition and, therefore, no data is supplied to the camera body C. This condition is dealt as a non-mounted condition.

Also, since the old lens assembly has a mount incompatible to the camera body and the new convertor, it cannot be mounted on the camera body C. It is also impossible to connect the new lens assembly or the new convertor with the AF convertor A because of the different mount configuration.

The AF convertor A can be coupled with the new convertor. In this case, if the old lens assembly is coupled with the AF convertor A, the focus detection and the AF mode operation can be performed, but they cannot be performed if no old lens assembly is coupled.

If in the new lens system a new lens assembly capable of effecting the focus detection, but incapable of performing the AF mode operation is available, it appears recommendable to construct such new lens assembly so as to be connectable with the AF convertor A, to add data of "AF OK" and "AF NO" other than those supplied from the lens assembly, to convert the "AF NO" data, fed from the lens assembly that cannot be used for automatic focus detection, into an "AF OK" data before it is supplied to the camera body C. With respect to the other data, they suffice to be converted into data similar to those in the new convertor.

Furthermore, for the purpose of distinguishing the AF convertor for use with such a new lens assembly from the other converters, arrangement may be made to provide an additional data so that a common data for both of the AF convertor A for use with the old lens assembly and the AF convertor for use with the new lens assembly can be outputted. With respect to the check data, it should be 88H since it can be used with the full aperture metering system.

Also, the use of an FA convertor capable of permitting the manual AF mode operation with the old lens assembly coupled therewith can be contemplated. In this case, the convertor check data is given 80H as is the case with the AF convertor A, and it may be so designed as to output only the "AF NO" data. However, a mechanism for moving the lens by the effect of the rotational force transmitted from the motor MO should be eliminated from such a convertor.

Operation of AF-purpose Microcomputer AMC

The operation of the AF-purpose microcomputer AMC will now be described with particular reference to FIG. 11 which is comprised of FIGS. 11(a) and 11(b).

When the signal line AFSTA sets up an "L" level state, an interruption signal is applied to the interruption terminal INTA of the microcomputer AMC, starting the program flow from step S1.

At step S1, the inputting of the interruption signal to an interruption terminal INTB is permitted and, at step S2, integration of the charge-coupled device DD starts. At step S3, a decision is made to determine if the integration of the charge-coupled device DD has completed.

At step S4, a subroutine for the limit position check is executed, which subroutine will be described later.

After the termination of the subroutine, and at step S5, data from the charge-coupled device are read in the AF-purpose microcomputer AMC through the interface circuit IFC. At step S6, the data so read in are used to calculate the defocus amount d. The calculating operation necessary to calculate the defocus amount d is well known in the art from, for example, the Japanese Laid-open Patent Publication No. 59-126517, and, therefore, the details thereof are not herein described for the sake of brevity.

At step S7, the subroutine for the limit position check is executed and, after the termination thereof and at step S8, a decision is made to determine if the signal line CSLE is rendered in an "L" level state. If it is in the "L" level state, it means that the computer CMC is in the process of reading the data from the convertor circuit CEC and, therefore, after the termination of this reading operation with the signal line CSLE being consequently rendered in a "H" level state, the program flow proceeds to step S9.

At step S9, a signal line DREQ is rendered in an "L" level state to permit the delivery of an interruption signal to the interruption terminal INT$_1$ of the computer CMC. At step S10, a decision is made to determine if the signal line CSAF is rendered in an "L" level state. When and after the signal line CSAF is rendered in the "L" level state, the serial inputting and outputting operation SIO is performed at step S11 and the check data 80H or 88H which is the content of the serial input and output register IOR is set in the register R10 at step S12.

At step S13, the serial inputting and outputting operation SIO is again executed, and at step S14, the motor rotational amount conversion coefficient $K_D$ or $k_D$ which is the content of the serial input and output register IOR is set in the register R11.

At step S15, a decision is made to determine if the signal line CSAF remains in the "L" level state. If it remains in the "L" level state, the program flow proceeds to step S16, but if it is in a "H" level state, the program flow proceeds to step S22.

In other words, when the computer CMC determines that it is the new lens system (i.e., when the result of decision at step S15 is "NO"), it is because the data transfer is disabled after the transfer of the 2-byte data (80H or 88H and $K_D$ or $k_D$) which has taken place from the step S11 to the step S14.

Figure 4:
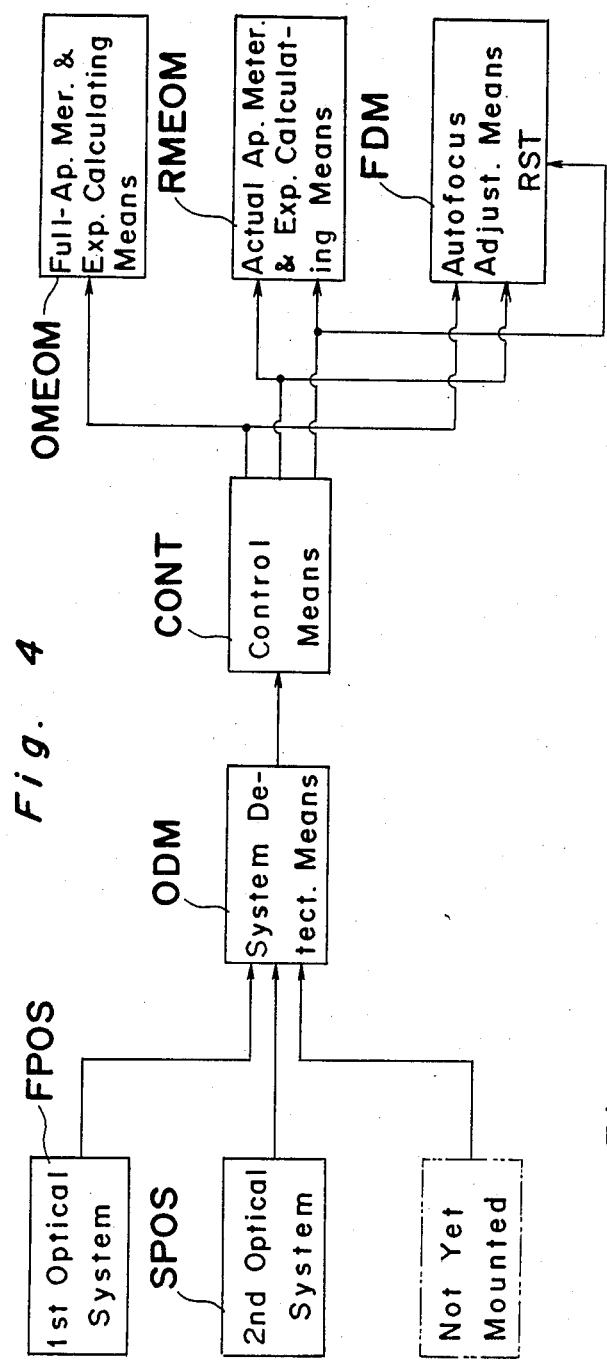

When it is determined that the AF convertor of FIG. 4 is used (i.e., the result of decision at step S15 is "YES", further 3-byte data (Lp, Lo and Lmax) are transferred from step S16 to step S20 and the AF-purpose microcomputer AMC after having sequentially read these data (Lp, Lo and Lmax) sets these data in respective register R12, R13 and R14.

As a result thereof, the data set in the registers R10 to R14 are such as tabulated in Table 9.

TABLE 9

| Registers | Data |
| --- | --- |
| R10 | 80H or 88H |
| R11 | $K_D$ or $k_D$ |
| R12 | Lp |
| R13 | Lo |
| R14 | Lmax |

After the microcomputer AMC has completely read the lens data fed from the computer CMC, and at step S22, a decision is made to determine which one of the AF mode and the FA mode the switch AFS is set to through an input port $IPH_{10}$ of the microcomputer AMC. Where the switch AFS is set to the FA mode, the program flow proceeds to step S23 to execute a subroutine for the FA mode, which subroutine will be described later.

It is to be noted that, in the case of the system having the previously described "AF OK" and "AF NO" data, a decision block may be provided between the block S22 and the block S23 to carry out a discrimination between the "AF OK" and "AF NO" data which have been read from the computer CMC so that, if the result of decision indicates "AF NO", the program flow can proceed to step S23 to execute the FA mode subroutine.

In the event that the result of decision at step S22 indicates that it is in the AF mode, the program flow proceeds to step S24 at which another decision is made to determine if the check data is 80H, that is, if the AF convertor A is mounted. Where the AF convertor A is mounted, the program flow proceeds to step #26, but if it is the new lens system, not the AF convertor A, the program flow proceeds to step S25.

Should the result of decision at S24 indicate that it is the AF convertor A, a decision is made at step S25 or S26 to determine if the distribution of brightness is of a value sufficient for the detection of the defocus amount d to be detected. If the result of decision at step S25 or S25 is "YES", the program flow proceeds to step S28 or S39, respectively. On the other hand, if it is "NO", a subroutine for low contrast scan is executed. In other words, an operation wherein a position at which the detection is possible is looked for while the convertor lens 1 is moved is carried out (the details of which will be described later).

It is, however, to be noted that the determination of whether or not the brightness distribution is enough for the detection to be carried out is well known and disclosed in, for example, the Japanese Laid-open Patent Publications No. 59-140408 and No. 60-4914 and, therefore, the details thereof will not be described herein for the sake of brevity.

If the result of decision at step S25 is "YES", the program flow proceeds to step S39 at which, on the basis of the defocus amount d calculated at step S6, the amount N of rotation of the motor MO necessary to move the focusing lens to the in-focus position is calculated using the equation of $(N = d \times K_D)$, followed by step S40 at which a subroutine for the motor drive is executed as will be described later. It is to be noted that the term "focusing lens" referred to above used to mean a lens of any one of the AF convertor, the new lens assembly and the new convertor which is actually used for focusing.

In the case of the AF convertor, if the result of decision at step S26 indicates that the detection is possible, the program flow proceeds to step S28 at which an address of a look-up table in the read-only memory in the AF-purpose microcomputer AMC, which corresponds to Table 2, is specified on the basis of the defocus amount the the current position data Lp of the convertor lens 1 and the focusing amount x necessary to move the convertor lens 1 to the in-focus position is determined on the basis of the defocus amount d and the current position data Lp of the convertor lens 1.

In the look-up table, specific values of the focusing amount x calculated by the use of the equations (7) and (8) are fixedly stored at respective addresses. In other words, by way of example, a more precise table than Table 2 is stored in the read-only memory.

Subsequently, a decision is made at step S29 to determine whether the lens is in the front focus position or in the rear focus position. In the case of the front focus position, the program flow proceeds to step S30, but in the case of the rear focus position, the program flow proceeds to step S34.

In the case of the front focus position, it is necessary to move the convertor forwardly with respect to the camera body C. Therefore, at step S30, a decision is made to determine if it is in a condition wherein, even though an attempt is made to move the convertor lens 1 over the focusing amount x from the current position forwardly with respect to the camera body C, the convertor lens 1 is brought to the farthest limit position Lmax and can no longer be moved to a position corresponding to Lp+x.

When the result of decision at step S30 indicates that the in-focus condition cannot be attained unless the convertor lens 1 be moved forwardly beyond the farthest limit position Lmax prior to the motor MO being driven, the program flow proceeds to step S31 at which the motor MO is driven at a high speed in a direction (rightwards) required for the convertor lens 1 to be moved forwardly with respect to the camera body C. Then, at step S32, the limit position detecting subroutine is executed as will be described later.

When as a result of execution of the limit position detecting subroutine at step S32 the convertor lens 1 is brought to the farthest limit position Lmax, the motor MO is brought to a halt and, at step S33, the front focus indicator FF is blinked warning that no automatic focusing capability is available. Thereafter, the program flow returns to step S2 in readiness for the next succeeding measurement.

On the other hand, if the result of decision at step S29 indicates that it is in the rear focus condition, not the front focus condition, the program flow proceeds to step S34 at which a decision is made to determine if it is in a condition wherein, even though an attempt is made to move the convertor lens 1 over the focusing amount x rearwardly with respect to the camera body, the convertor lens 1 is brought to the closest limit position Lo and can no longer be moved to a position corresponding to Lo−x.

When the result of decision at step S34 indicates that the in-focus condition cannot be attained unless the convertor lens 1 be moved rearwardly beyond the closest limit position Lo prior to the motor being driven, the closest limit position Lo and can no longer be moved, the program flow proceeds to step S35, as is the case with the front focus condition, to drive the motor Mo at a high speed in a different direction (leftwards) required for the convertor lens 1 to be moved rearwardly with respect to the camera body C. Then at step S36, the limit position detecting subroutine is executed as will be described later.

When as a result of execution of the limit position detecting subroutine at step S36 the convertor lens 1 is brought to the closest limit position Lo, the motor MO is brought to a halt and, at step S37, the rear focus indicator RF is blinked warning that no automatic focusing capability is available. Thereafter, the program flow returns to step S2 in readiness for the next succeeding measurement.

Where the front or rear focus indicator FF or RF is energized to blink in the manner as hereinabove described, the photographer is informed that the automatic focus adjustment cannot be performed relying on the automatic focusing device built in his camera body. In this case, the photographer should manipulate the focusing ring 49 provided in the interchangeable lens assembly, which is an old lens assembly and which is coupled with the AF convertor AF, to move the first optical system Le to bring it in the in-focus condition. In other words, the manual focus adjustment is required when any one of the front and rear focus indicators FF and RF blinks.

However, where the result of decision at step S30 or S34 indicates that the automatic focusing capability is available with the AF convertor AF, the program flow proceeds to step S38 at which the amount N of rotation of the motor M required to move the convertor lens 1 by the focusing amount x is calculated according to the equation of $(N=x \times k_D)$, followed by the execution of the motor drive subroutine at step S40 which will now be described with particular reference to FIG. 12.

Motor Drive Subroutine

Figure 12:
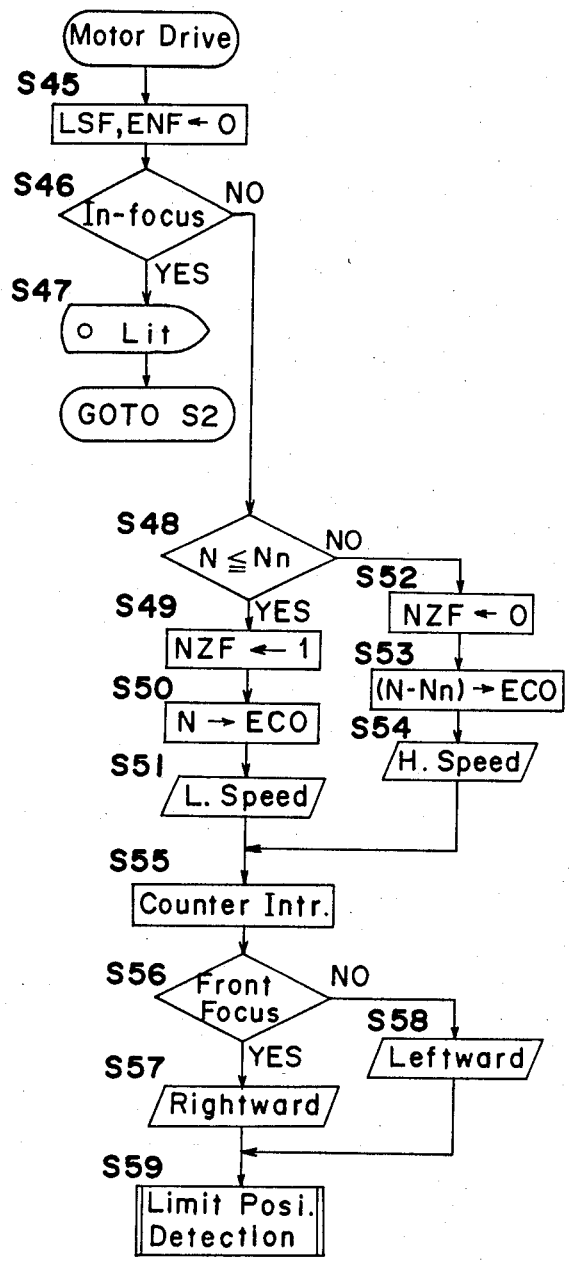
FIG. 12 is a flowchart showing a motor drive subroutine.

Referring now to FIG. 12, and at step S45, flags LSF and ENF are reset. The flag LSF means that, when it is "1", a low contrast scanning operation is performed, but when it is "0", it is not performed. The flag ENF means that, when it is "1", the focusing lens is held at an infinity position during the low contrast scanning operation, but when it is "0", the low contrast scanning operation is being performed or the normal focus detection is being performed.

The flags LSF and ENF are reset at step S45 for the purpose of releasing them because the condition in which the focus detection is impossible might have been created during the previous operation.

At step S46, a decision is made to determine if the defocus amount d is within an in-focus range. If the defocus amount d is within the in-focus range, the program flow proceeds to step S47 to effect the in-focus display, followed by the return to step S2 in readiness for the subsequent measurement.

On the other hand, if the defocus amount d is not within the in-focus range, the program flow proceeds to step S48 to determine if the amount N of rotation of the motor is equal to or smaller than the amount Nn of rotation of the motor corresponding to the in-focus range. The motor rotational amount Nn corresponding to the in-focus range is as follows:

$$Nn = dn \times K_D,$$

or $$Nn = xn \times k_D$$

wherein dn represents a near in-focus range per unit defocus amount, and xn represents a near in-focus range per unit amount of movement of the convertor lens 1.

The width of the near in-focus range is so selected that, when any lens is brought to a halt by braking the motor MO being then rotated at the high speed, it will not overrun the in-focus position.

When the result of decision at step S48 indicates that the motor rotational amount N is within the near in-focus range, the program flow proceeds to step S49 to set a near zone flag NZF to "1". Subsequently, and at step S50, the motor rotational amount N already calculated is preset in the presettable event counter ECO. After at step S51 the motor MO has been driven at a predetermined low speed controlled by monitoring pulses fed from the pulse encoder ENC, step S55 takes place.

Where the result of decision at step S48 indicates that the motor rotational amount N is not within the near in-focus range, the program flow proceeds to step S52 to reset the near zone flag NZF to "0". Subsequently, and at step S53, a data representative of (N−Nn), that is, the difference between the motor rotational amount N already calculated and the rotational amount Nn within the near in-focus range, is preset in the presettable event counter ECO. At step S54, the motor is driven at a high speed (with no control of the speed being effected), followed by step S55.

At step S55, a counter interruption is enabled, which interruption would occur when the event counter ECO counts in a subtracting direction the pulses from the pulse encoder ENC transmitted through an input CKIN of the AF microcomputer AMC to reduce its count contents to zero.

Thereafter, step S56 takes place at which a decision is made to determine if it is the front focus condition. In the case of the front focus condition, the program flow proceeds to step S57 to drive the motor M rightwards for moving the convertor lens 1 in a direction away from the camera body C, that is, in a forward direction. On the other hand, if it is not in the front focus condition, the program flow proceeds to step S58 at which the motor MO is driven leftwards for moving the convertor lens 1 in a different direction close towards the camera body C, that is, in a rearward direction.

Subsequent to the rightward or leftward rotation of the motor MO, the program flow proceeds to step S59 to execute the limit position detecting subroutine.

It is to be noted that it may occur that, for a given defocusing direction, the direction of movement of the convertor lens 1 of the AF convertor AF shown in FIG. 4 may differ from that of the focusing lens (convertor lens 1). In the automatic focusing device according to the present invention, however, the drive mechanism for driving the focusing lens is so designed that for the given defocusing direction the motor MO can be driven in the same direction.

Figure 11A:
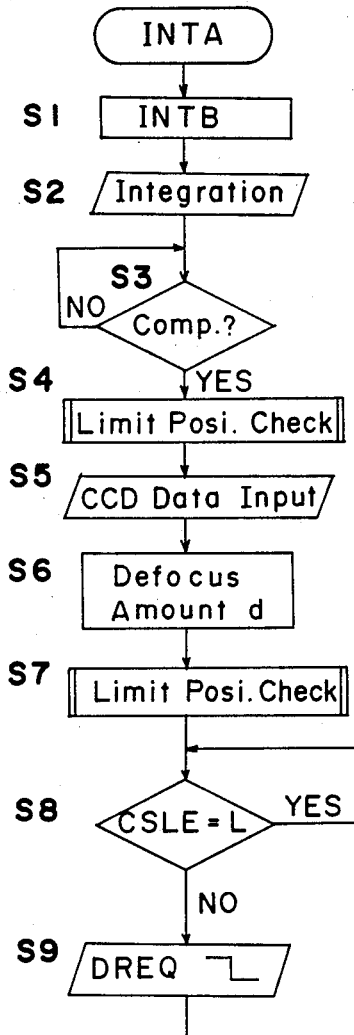
FIG. 11, comprised of FIGS. 11(a) and 11(b), is a flowchart showing the sequence of control performed by an AF-purpose microcomputer.
Figure 11A:
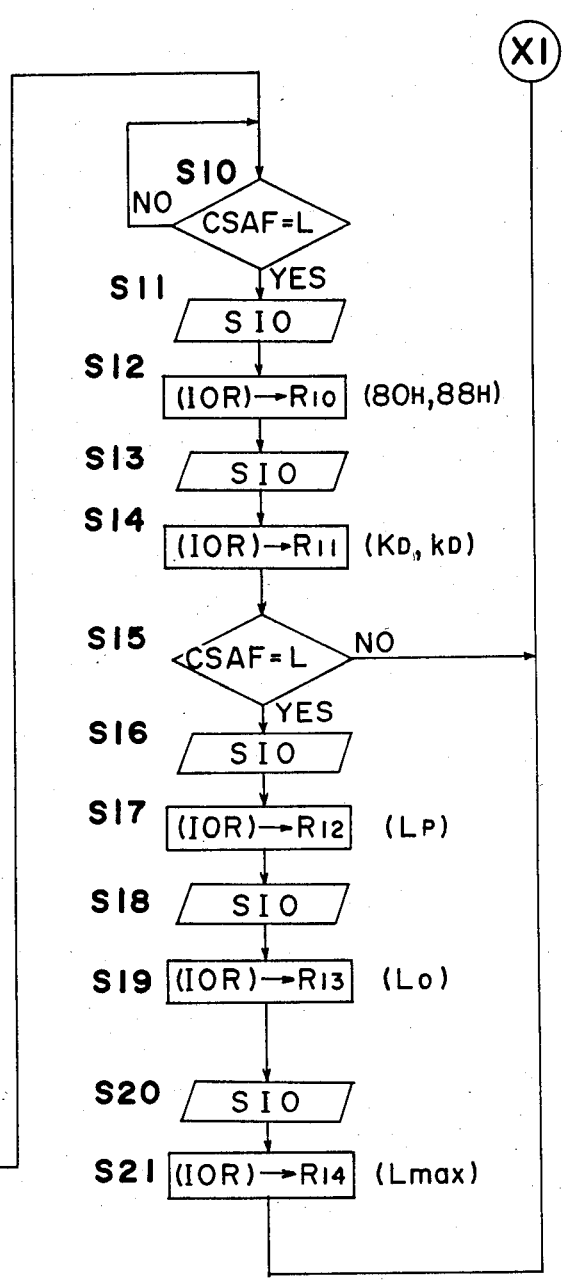

In the foregoing description, the program flow including the steps S37 to step S47 shown in FIG. 10 and the program flow including the steps S24, S26 and S28 shown in FIG. 11 altogether correspond to the defocusing amount/focusing amount data conversion means DMDM referred to in the present invention.

Also, the defocus amount detecting means DFDM referred to in the present invention corresponds to the program flow including the steps S2 to S6 shown in FIG. 11.

In other words, the program flow including the steps #37 to #43 shown in FIG. 10 and the program flow including the steps S2 to S6 shown in FIG. 11 corresponds to the detecting means for detecting the defocus amount d. The program flow including the steps S24, S26 and S28 corresponding to the the converting means for converting the defocus amount d into the focusing amount x.

Accordingly, these program flows correspond to the focusing amount calculating means PMCM referred to in the present invention.

Moreover, the program flow including the steps #42 and #43 shown in FIG. 10 corresponds to the limit position data outputting means EDOM, the program flow including the steps #44 to #47 shown in FIG. 10 corresponds to the current position data outputting means PDOM referred to in the present invention, and the program flow including the steps S29 and S30 or the steps S29 and S34 shown in FIG. 11 correspond to the focus control determining means PCJM referred to in the present invention.

Limit Position Detecting Subroutine J

The limit position detecting subroutine will now be described with reference to FIG. 13. This limit position detecting subroutine is executed subsequent to the high speed drive of the motor MO which takes place after the result of decision at step S30 has indicated that the in-focus condition cannot be attained unless the convertor lens 1 be moved forwardly beyond the farthest limit position Lmax, or when the result of decision at step S34 has indicated that the in-focus condition cannot be attained unless the convertor lens 1 be moved rearwardly beyond the closest limit position Lo, or at the termination of the motor drive subroutine shown in FIG. 12.

Figure 13:
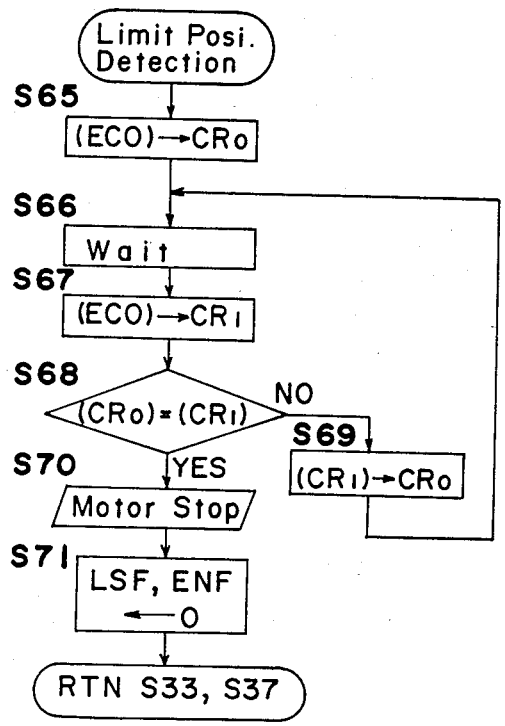
FIG. 13 is a flowchart showing a limit position detecting subroutine.

Referring now to FIG. 13, and at step S65, the content of the presettable event counter ECO capable of performing the counting in a subtracting direction in response to pulses fed from the encoder ENC is set in a register CRo, followed by a wait condition at step S66. After the lapse of a predetermined time, and at step S67, the content of the presettable event counter ECO is set in a register CR1.

At step 68, a decision is made to determine if the content of the register CRo coincides with the content of the register CR1. If the both do not coincide with each other, it means that the slit plate 46 in the encoder ENC is being rotated with the focusing lens being moved. In this case, the program flow proceeds to step S69 to set the content of the register CR1 in the register CRo, followed by the return to step S66.

On the other hand, if the both coincide with each other, it means that, despite the fact that the motor MO is being rotated, the slit plate 46 of the encoder ENC is held standstill. In other words, the motor MO is driven idle while the focusing lens has been brought to one of the opposite limit positions (the closest or farthest limit position Lo or Lmax in the case of the AF convertor, or the infinity or closest available position in the case of the new lens assembly). In this case, the program flow proceeds to step S70 at which the motor MO is brought to a halt. Subsequently, and at step S71, the flags LSF and ENF are reset for the purpose of releasing them because the condition in which the focus detection is impossible might have been created during the previous operation.

After step S71, the program flow return to steps S33 or S37 shown in FIG. 11. Accordingly, at step S33 or S37, the photographer is informed that, despite of the fact that the front or rear focus condition has been detected, the focusing lens cannot be driven to the in-focus position. Thereafter, the program flow return to step S2 for carrying out the next succeeding measurement.

It is to be noted that, during the normal focus adjusting operation, the content of the presettable event counter ECO is rendered "0" in response to the pulses from the encoder ENC during the execution of the steps S65 to S69 and a counter interruption is enabled to execute a counter interruption subroutine shown in FIG. 14 as will be subsequently described.

It is also to be noted that the program flow including the steps S29, S30, S38 and S40 or the steps S29, S34, S38 and S40 shown in FIG. 11 and the program flow including S45, S46, and S48 to S59 shown in FIG. 12 corresponds to the optical system drive means LDM referred to in the present invention.

The step S31 or S35 shown in FIG. 11 and the limit position detecting subroutine shown in FIG. 13 altogether correspond to the second optical system drive means SDM referred to in the present invention, whereas the limit position detecting subroutine shown in FIG. 13 and the step S33 or S37 shown in FIG. 11 altogether correspond to the first optical system moving direction display means FMDDM referred to in the present invention.

Counter Interruption Subroutine

Hereinafter, the operation will be described with reference to FIG. 14, which takes place when the counter interruption is enabled as a result of the movement of the convertor lens 1 over a distance corresponding to the expected rotational amount N during the rotation of the motor MO, as a result of the setting of the content of the presettable event counter ECO to "0" in response to the pulse from the encoder ENC generated when the focus condition is established, or as a result of the setting of the content of the presettable event counter ECO to "0" in response to the pulse from the encoder ENC which is generated when the lens is moved to the near focus range subsequent to the drive of the motor MO effected while the lens is out of the near focus range.

Figure 14:
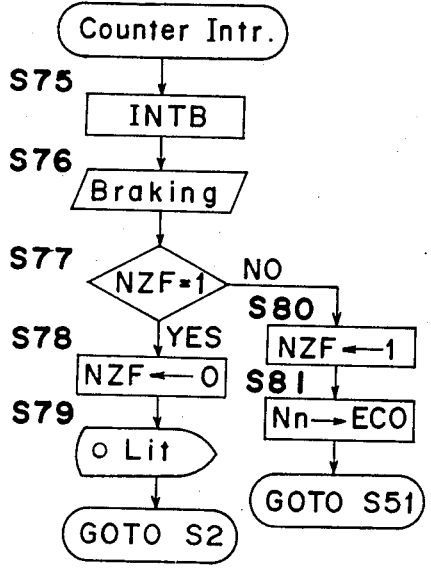
FIG. 14 is a flowchart showing a counter interruption subroutine.

As shown in FIG. 14, when the counter interruption is enabled, no other interruption is enabled and, therefore, at step S75, a condition is established wherein the interruption signal is permitted to enter the interruption terminal INTB. Then, at step S76, the motor MO is braked.

Subsequently, and at step S77, a decision is made to determine if the convertor lens 1 has started its movement from the near focus range, that is, if the near zone flag NZF rendered "1". Where the convertor lens 1 is moved from a position outside the near focus range, it means that the focusing lens has arrived in the near focus range and, in this case, since the near zone flag is "0", the program flow proceeds to step S80 at which the near zone flag NZF is set to "1". Then, after the the rotational amount Nn corresponding to the near focus range has been set in the presettable event counter ECO at step S81, the program flow proceeds to step S52, shown in FIG. 12, to drive the motor MO at the low speed, thus executing the program flow from step S51 et. seqq.

The purpose of setting the near zone flag NZF to "1" at step S80 is to enable a decision step S77, as will be described subsequently, to give "YES" when the next succeeding counter interruption is enabled (when the convertor lens has arrived at the in-focus position).

Should the result of decision at step S77 indicates that the near zone flag NZF is "1", it means that the focusing lens has been moved from the near focus range and, in this case, the program flow proceeds to step S78 at which the near zone flag NZF is reset to "0".

On the other hand, should the result of decision at step S77 is "YES", it means that the motor MO is driven at the low speed and, therefore, the focusing lens is brought to a halt at the in-focus position because of the braking effected to the motor MO at step S76. Accordingly, at step S79, an in-focus indicator FM is lit, followed by the return of the program flow to step S2 in readiness for the next succeeding measurement.

Low Contrast Scanning Subroutine

Figure 15:
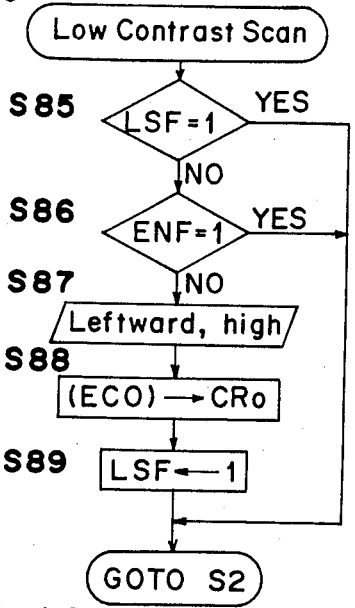
FIG. 15 is a flowchart showing a low contrast scanning subroutine.

The subroutine for the low contrast scanning will now be described with reference to FIG. 15. This low contrast scanning subroutine is executed for the purpose of enabling the brightness distribution to be detectable by moving the focusing lens.

When the result of decision at steps S25 and S26 shown in FIG. 11 indicates that the brightness distribution is insufficient for the detection of the defocus amount d, the low contrast scanning subroutine is executed at step S27. This step S27 is followed by step S85 at which a decision is made to determine if the flag LSF is "1". This flag LSF is set to "1" during the operation of low contrast scanning.

Since the flag LSF is "0" at the time the low contrast scanning subroutine is first initiated, the program flow proceeds to step S86. At step S86, a decision is made to determine if the flag ENF is "1". If the flag ENF is set to "1", it means that the low contrast scanning has completed and the brightness distribution is still insufficient for the detection of the defocus amount d. However, since the flag ENF is "0" at the time of the initial execution of this low contrast scanning subroutine, the program flow proceeds to step S87 at which the motor MO is driven leftwards at a high speed to move the convertor lens 1 in the rearward direction towards the closest limit position Lo.

Subsequently, at step S88, the content of the presettable event counter ECO is set to the register CRo, and after the flag LSF is set to "1" at step S89 because of the low contrast scanning being performed, the program flow return to step S2.

Where the result of decision at step S85 indicates that the flag LSF is "1", it means that the brightness distribution is defective during the performance of the low contrast scanning, and the program flow accordingly proceeds direct to step S2 without proceeding to step S87 (while the low contrast scanning is still performed).

Should the result of decision at step S86 is "YES", it means that the lens is moved from the closest available position towards the infinity position during the low contrast scanning, or it means that, notwithstanding the termination of the low contrast scanning, the brightness distribution is still defective. In this case, the program flow proceeds direct to step S2 without proceeding to step S87 (while the low contrast scanning is still performed or without the low contrast scanning being performed.

Limit Position Check Subroutine

Figure 16:
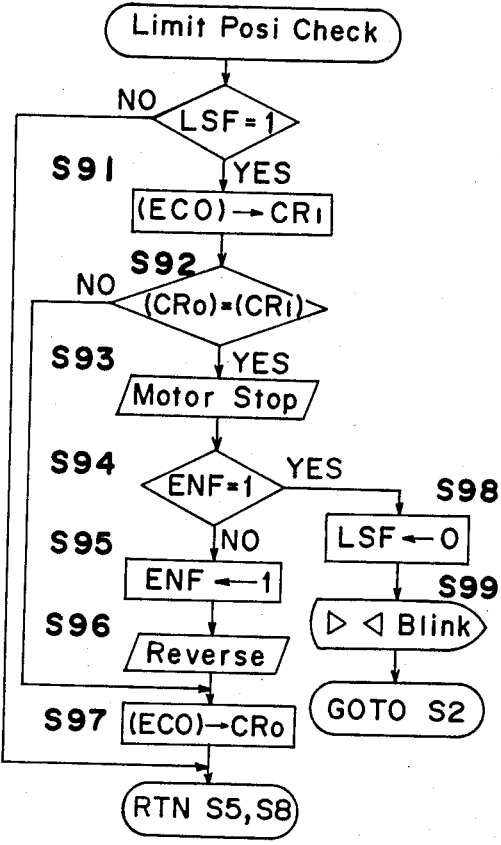
FIG. 16 is a flowchart showing a limit position checking subroutine.

The limit position check subroutine is shown in FIG. 16.

At the execution of the limit position check subroutine at step S4 or S7 shown in FIG. 11, and at step S90, a decision is made to determine if the flag LSF is set to "1". In the case of the flag LSF being set to "0", it means that the low contrast scanning is not performed and, therefore, the program flow proceeds to step S5 or S8 shown in FIG. 11.

On the other hand, in the case of the flag LSF being set to "1", it means that the low contrast scanning is being preformed, and accordingly, the program flow proceeds to step S91 at which the content of the presettable event counter ECO is set in the register CR1.

Subsequently, and at step S92, a decision is made to determine if the content of the register CRo coincides with that of the register CR1. In this case, during the execution of the previous low contrast scanning subroutine or during that of the limit position check subroutine, the content of the presettable event counter ECO is set in the register CRo.

If the content of the register CRo does not coincide with that of the register CR1 as determined at step S92, it means that the focusing lens is being moved. In this case, the program flow proceeds to step S97 at which the content of the presettable event counter ECO is set in the register CRo, after which the program flow returns to step S5 or S8 shown in FIG. 11.

If the content of the register CRo coincides with that of the register CR1, it means that the focusing lens is brought to a halt at the closest available position or the infinity position with the motor MO consequently rotated idle, and accordingly, the program flow proceeds to step S93. After the motor MO has been brought to a halt at step S93, a decision is made at step S94 to determine if the flag ENF is set to "1".

This flag ENF is set to "1" when the focusing lens is brought to a halt at the closest available position during the low contrast scanning. Accordingly, if the result of decision at step S94 indicates that the flag ENF is set to "1", it means that during the movement of the focusing lens from the closest available position back towards the infinity position no undetectable condition is found, and accordingly, the program flow proceeds to step S98.

At step S98, the flag LSF is set to "0", followed by step S99 at which the front focus indicator FF and the rear focus indicator RF are simultaneously blinked to inform that no automatic focusing capability is available. Then, the program flow return to S2.

On the other hand, if the result of decision at step S94 indicates that the flag ENF is "0", it means that the focusing lens is brought to a halt at the infinity position, and accordingly, the program flow proceeds to step S95. After the flag ENF has been set to "1" at step S95, the motor MO is reversed at step S96 to drive the focusing lens in a direction towards the infinity position. Then, the content of the presettable event counter ECO is set in the register CRo at step S97, followed by step S5 or S8 shown in FIG. 11.

FA Mode Subroutine

Figure 17:
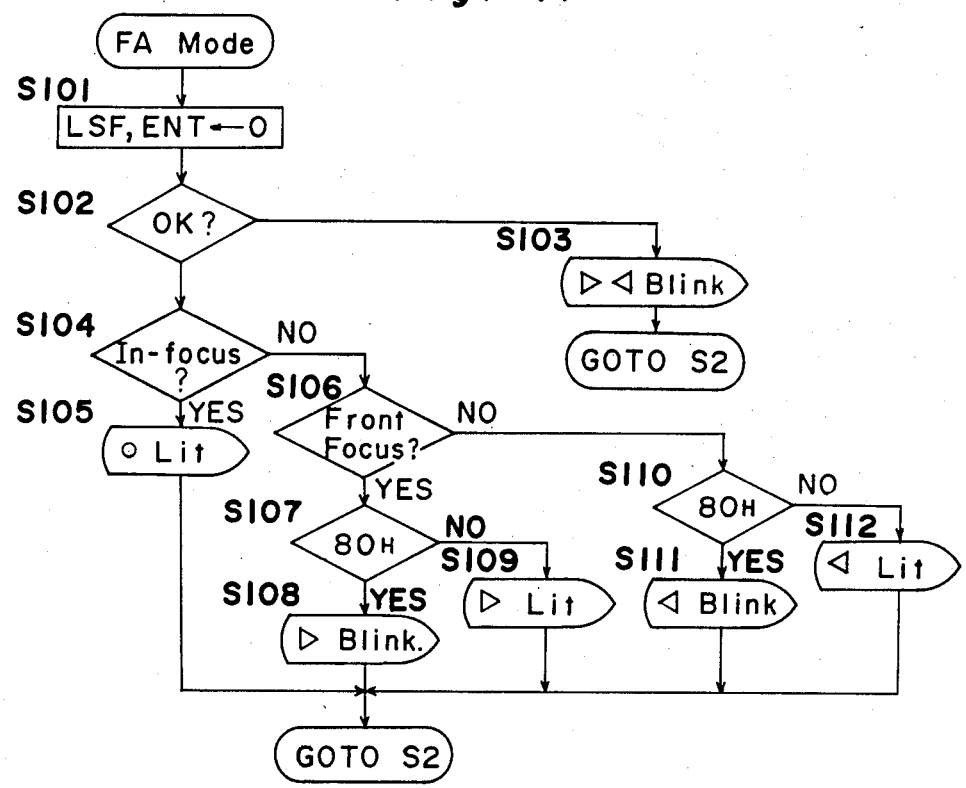
FIG. 17 is a flowchart showing an FA-mode subroutine.

Referring to FIG. 17, the FA mode subroutine will be described.

The resetting the flags LSF and ENF at step S101 corresponds to the switching of the AF mode over to the FA mode.

At step S102, a decision is made to determine if the measurement of the defocus amount d is possible. In the case where the measurement of the defocus amount d is impossible, the program flow proceeds to step S103 at which the front and rear focus indicators FF and RF are blinked and, thereafter, the program flow returns to step S2. On the other hand, if the measurement of the defocus amount d is possible, the program flow proceeds to step S104 at which a decision is made to determine if the in-focus condition is assumed.

In the case of the in-focus condition, the program flow proceeds to step S105 at which the in-focus indicator FM is lit, followed by the return of the program flow to S2.

On the other hand, if it is not in the in-focus condition, a decision is made at step S106 to determine if it is in the front focus condition. In the case of the front focus condition, the program flow proceeds to step S107 at which a decision is made to determine if the AF convertor A of the type shown in FIG. 4 has been mounted, that is, if the check dats is 80H. If the AF convertor A of FIG. 4 has been mounted, the program flow proceeds to step S108 at which the front focus indicator FF is blinked. On the other hand, if it is not mounted, the program flow proceeds to step S109 at which the front focus indicator FF is lit. Subsequent to the blinking or lighting of the front focus indicator FF, the program flow returns to step S2.

Should the result of decision at step S106 indicates that it is not in the front focus condition, it means that it is in the rear focus condition, and accordingly, a decision is made at step S110 to determine if the AF convertor A has been mounted, i.e., if the check data is 80H. When the AF convertor A has been mounted, the program flow proceeds to step S111 at which the rear focus indicator RF is blinked. On the other hand, if it is not mounted, the program flow proceeds to step S112 at which the rear focus indicator RF is lit. Then, after the blinking or lighting of the rear focus indicator RF, the program flow returns to step S2.

INTB Interruption Subroutine

Figure 18:
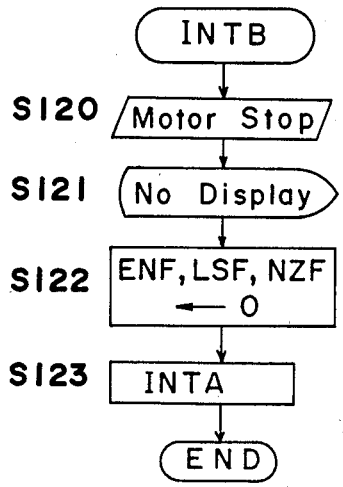
FIG. 18 is a lfowchart showing an INTB interruption subroutine.

The subroutine of the interruption to the interruption terminal INTB of the Af-purpose microcomputer AMC will now be described with particular reference to FIG. 18.

When the signal line AFSTP extending from the computer CMC sets down to an "L" level state, the AF-purpose microcomputer AMC performs an operation based on the interruption signal applied to the interruption terminal INTB.

At step S120, the motor MO is brought to a halt, and at step S121, all of the front focus indicator FF, the rear focus indicator RF and in the in-focus indicator FM are switched off. Then, at step S122, all of the flags LSF and ENF and the near zone flag NZF are reset. Following the step S122, the operation based on the interruption signal applied to the interruption terminal INTA is enabled with the AF-purpose microcomputer consequently brought to a halt at step S123.

Different FA Mode Subroutine

The FA mode subroutine different from that shown in FIG. 17 will now be described with reference to FIG. 19.

Figure 19:
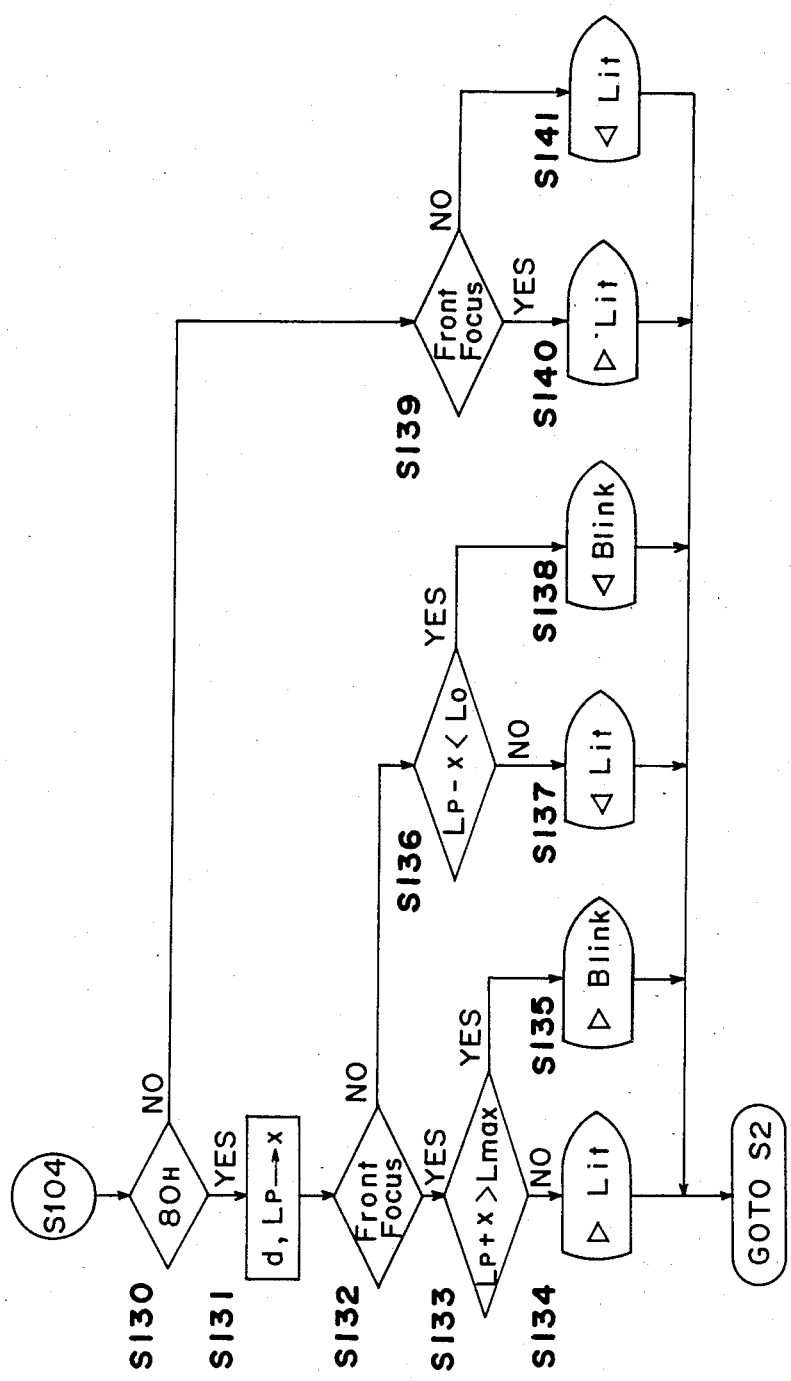
FIG. 19 is a flowchart showing an FA-mode subroutine.

Although not shown in FIG. 19, this different FA mode subroutine includes the same program flow as that consisting of steps S101 to S105 shown in FIG. 17. In other words, if the result of decision at step S104 indicates that it is not in the in-focus condition, the program flow proceeds to step S130 at which a decision is made to determine if the AF convertor A has been mounted, that is, if the check data is 80H. Where the AF convertor A has been mounted, the focusing amount x necessary to move the convertor lens 1 to the in-focus position is calculated at step S131 on the basis of the defocus amount d and the current position data Lp of the convertor lens 1, using the look-up table in the read-only memory of the AF microcomputer AMS (same as step S28 shown in FIG. 11).

Then, at step S132, a decision is made to determine if it is in the front focus condition. In the case of the front focus condition, the program flow proceeds to step S133, but in the case of the rear focus condition, the program flow proceeds to step S136.

At step S133, a decision is made to determine if the in-focus condition can be obtained when the convertor lens 1 is moved from the current position Lp a distance corresponding to the required focusing amount x. This is the same as step S30 shown in FIG. 11.

Where the in-focus condition cannot be attained even though the convertor lens 1 is moved to the fathest limit position Lmax, the program flow proceeds to step S135 at which the front focus indicator FF is blinked, but where the in-focus condition can be attained when the convertor lens 1 is moved to the farthest limit position, the front focus indicator FF is lit at step S134. After the blinking or lighting, the program flow returns to step S2.

In the case of the rear focus condition as determined at the decision step S132, the program flow proceeds to step S136 at which a decision is made to determine if the in-focus condition can be attained when the convertor lens 1 is moved to the closest position Lo. This is the same as step S34 shown in FIG. 11.

Where the in-focus condition cannot be attained even though the convertor lens 1 is moved to the closest limit position Lo, the program flow proceeds to step S138 at which the rear focus indicator RF is blinked, but where the in-focus condition can be attained when the convertor lens 1 is moved to the closest limit position, the rear focus indicator RF is lit at step S137. After the blinking or lighting, the program flow returns to step S2.

Assuming that the AF convertor A is not mounted as determined at the decision step S130 (that is, if the check data is not 80H), it means that either the new lens assembly or the new convertor is used, and accordingly, the program flow proceeds to step S139 at which a decision is made to determine if it is in the front focus condition. In the case of the front focus condition, the program flow proceeds to step S140 to cause the front focus indicator FF to blink, but in the case of the rear focus condition, the program flow proceeds to step S141 to cause the rear focus indicator RF to be lit, after which the program flow returns to step S2 in either case.

Modified Program Flow

Figure 2:
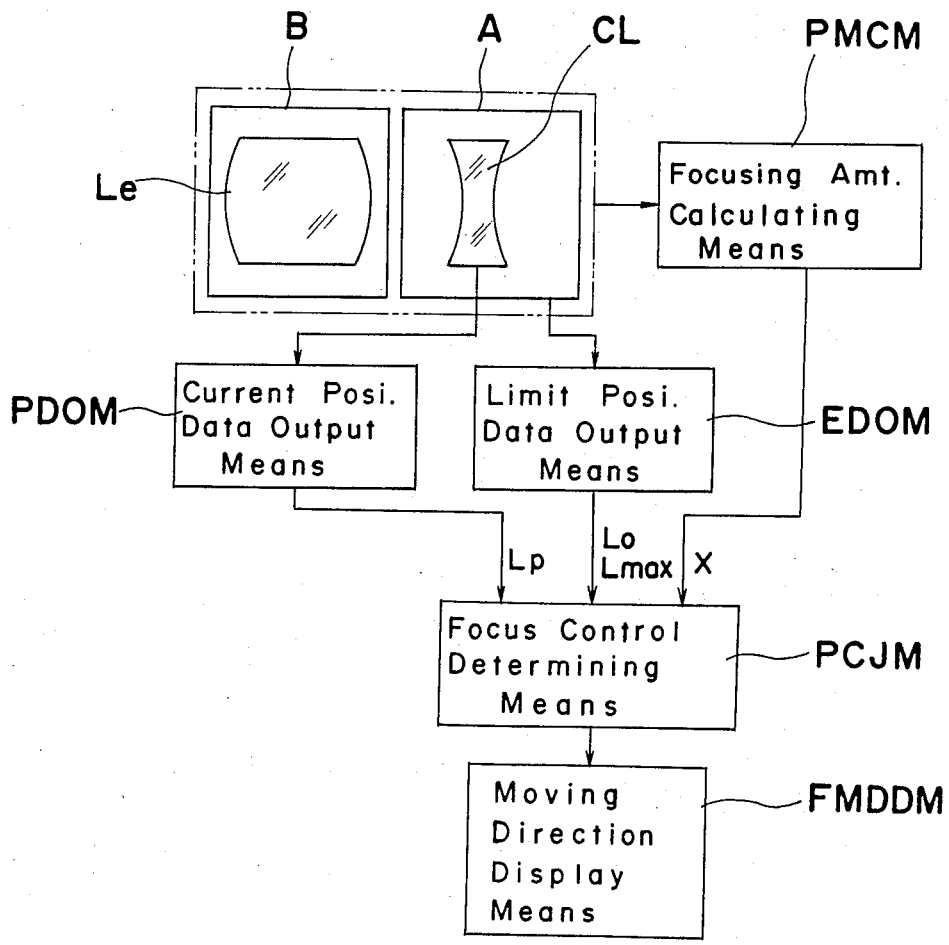
Figure 3:
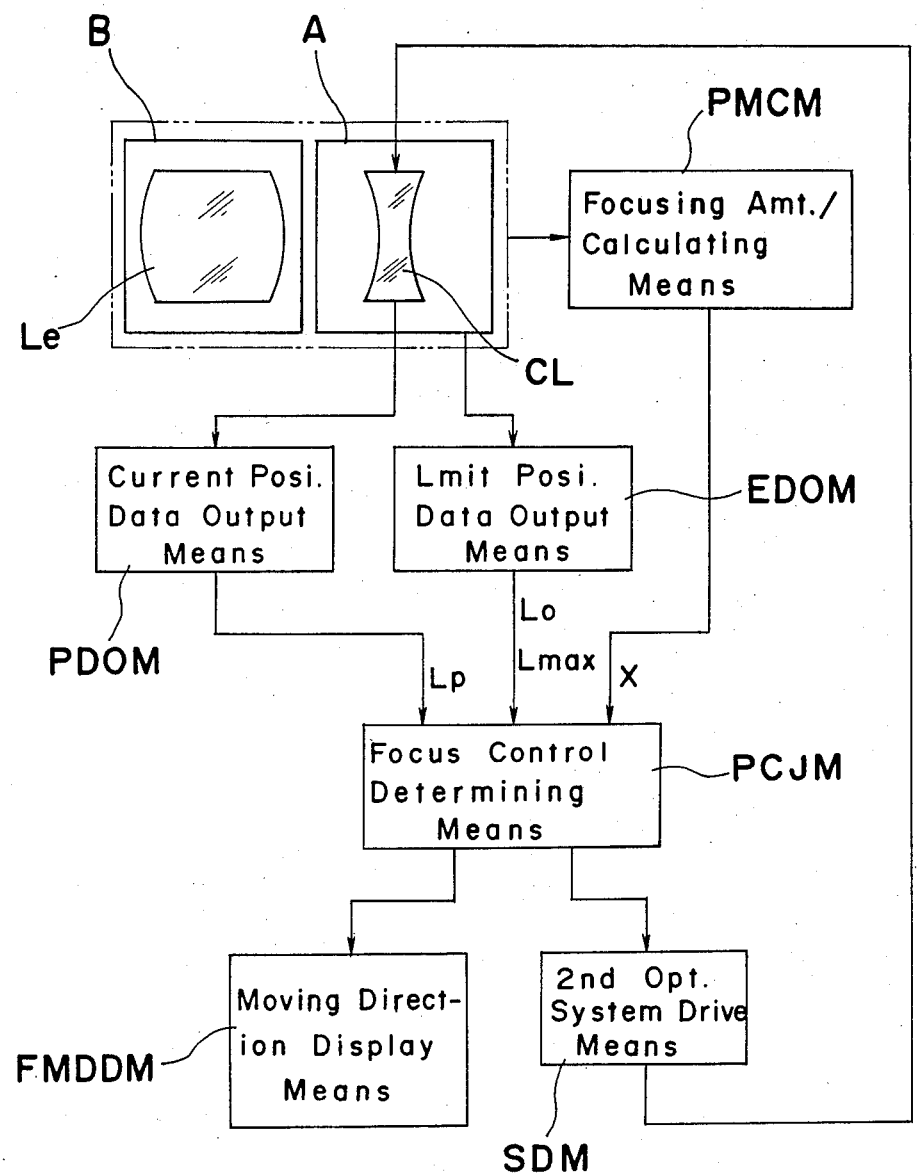

With respect to features of the present invention shown in FIGS. 2 and 3, it is apparent that an omission of SDM from FIG. 3 results in FIG. 2.

Figure 11B:
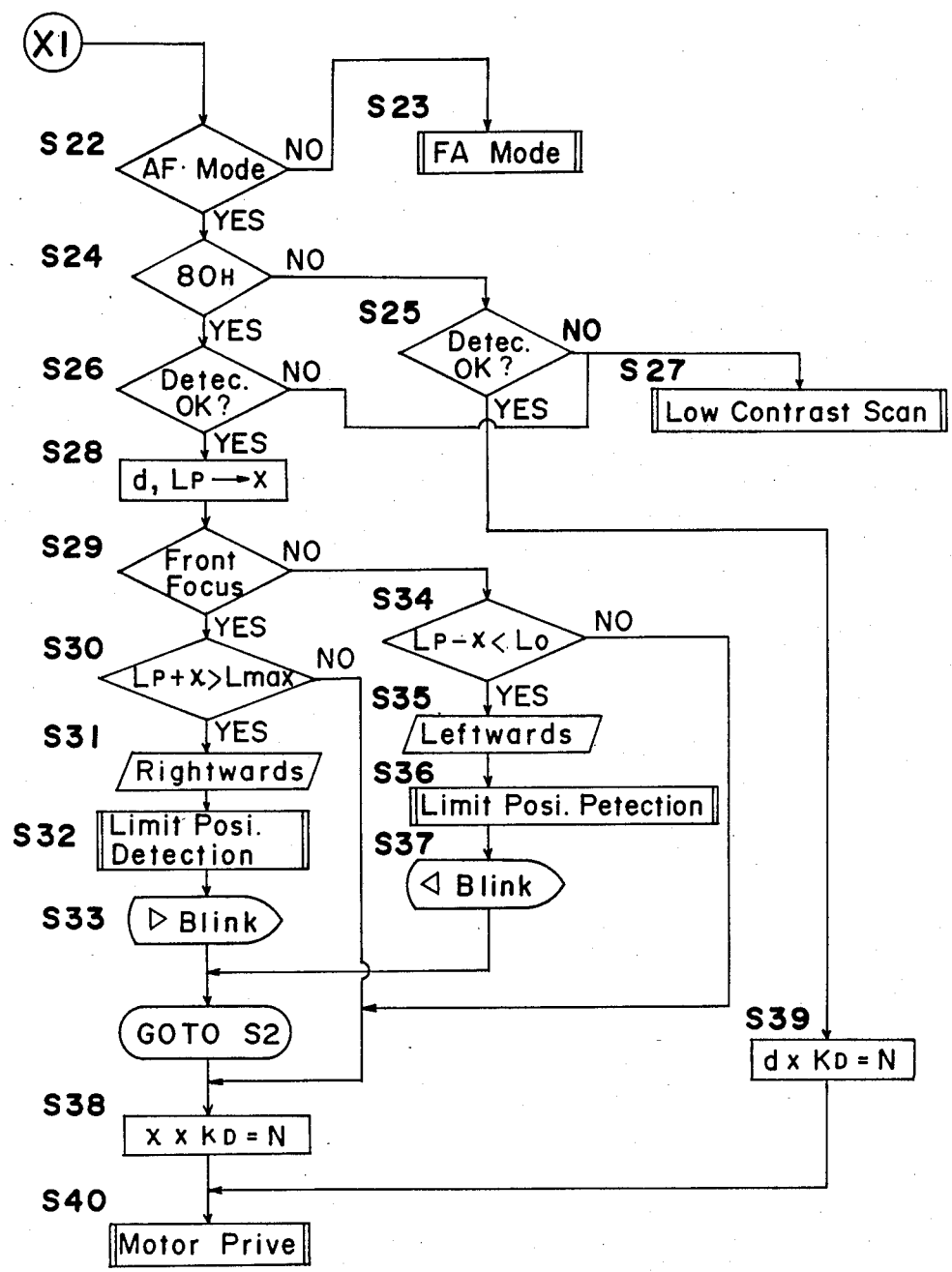
Figure 20:
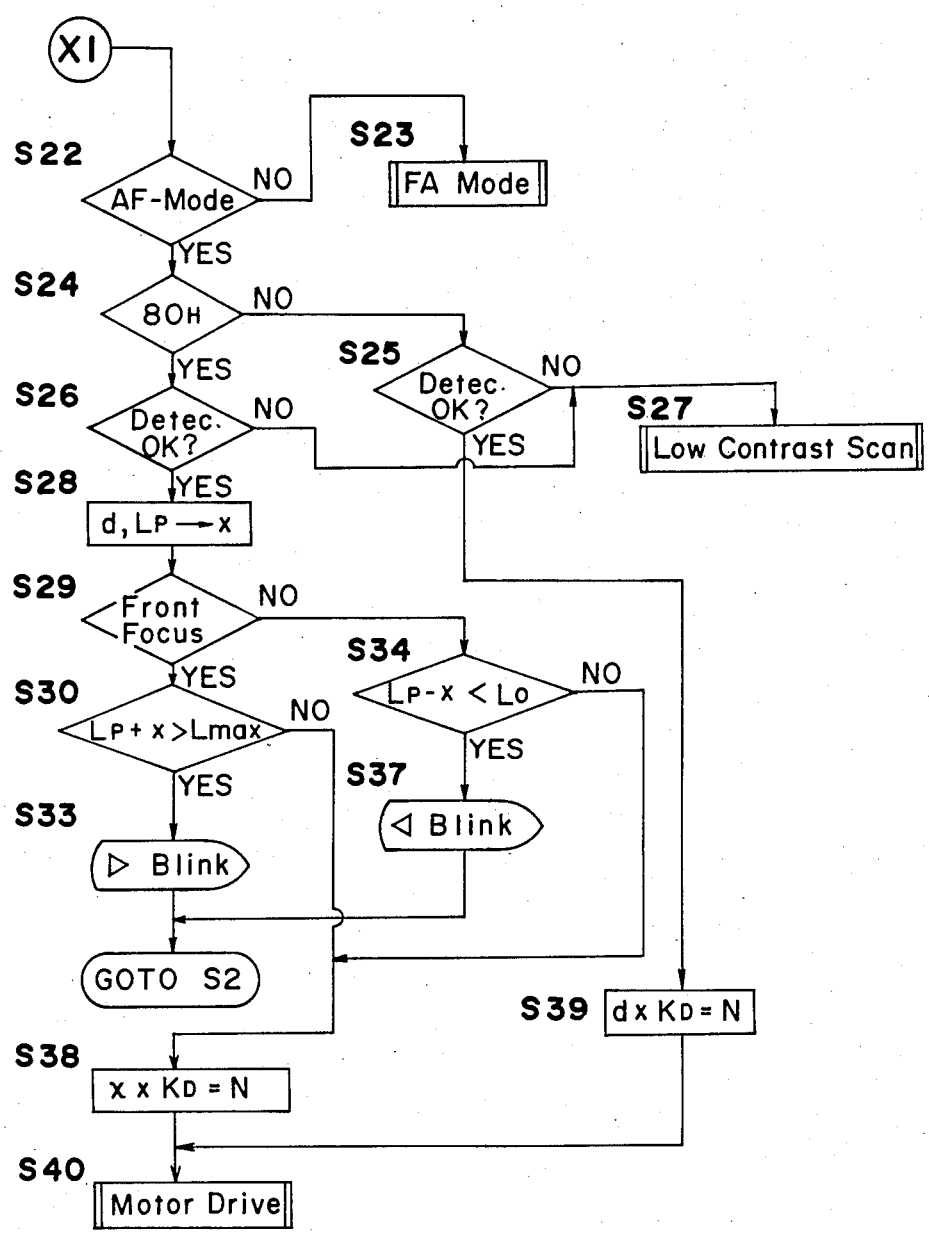
FIG. 20 is a flowchart showing a modified form of the program shown in FIG. 11.

FIG. 20, which is a modification of FIG. 11, shows the way of actually omitting the function of SDM in terms of program flow of the embodiment. It is, however, to be noted that, for the sake of brevity, that portion of the program flow which is shown in FIG. 11(a) is omitted because the modification according to the present invention resides in the portion of the program flow shown in FIG. 11(b).

Referring to FIG. 20, the difference between the program flow portion shown in FIG. 11(a) and that shown in FIG. 20 resides in that the steps S31, S32, S35 and S36 employed in the program flow of FIG. 11 are omitted in the program flow of FIG. 20. In other words, according to the modification shown in FIG. 20, the use of the second optical system drive means SDM for driving the convertor lens 1 ≡ the second optical system CL of the AF convertor A to the limit position in a direction towards the in-focus condition, which is necessitated in the foregoing embodiment when the result of decision rendered by the focus control determining means PCJM (that is, the result of decision carried out to determine if the imagewise light carrying an image of the target object can be controlled to the in-focus condition by moving over the focusing amount x the second optical system CL ≡ convertor lens 1) is negative, is not essential in the practice of the present invention.

Accordingly, if the program flow shown in FIG. 20 is employed to control the overall operation, the same construction and functions as described in connection with the foregoing embodiment can be employed. This also applied to the program flow shown in FIG. 19.

Referring to FIG. 20, when the result of decision at step S30 indicates that, even though an attempt is made to move the convertor lens 1 from the current position Lp frontwardly over the focusing amount x, the convertor lens 1 cannot be moved to a position corresponding to Lp+x because it has been brought to a halt at the farthest limit position Lmax, the program flow proceeds to step S33 at which the front focus indicator FF is blinked, warning that the automatic focusing capability is not available. Thereafter, the program flow return to step S2.

On the other hand, when the result of decision at step S30 indicates that, even though an attempt is made to move the convertor lens 1 from the current position Lp rearwardly over the focusing amount x, the convertor lens 1 cannot be moved to a position corresponding to Lp−x because it has been brought to a halt at the closest limit position Lmax, the program flow proceeds to step S37 at which the rear focus indicator RF is blinked, warning that the automatic focusing capability is not available. Thereafter, the program flow return to step S2.

Thus, in the event that any one of the front and rear focus indicators FF and RF is blinked in the respective manner as hereinabove described, the photographer can be informed of the incapability of the automatic focusing function and of the necessity of the manipulation of the focusing ring 49 of the interchangeable lens assembly A, which is the old lens assembly and which is coupled with the AF convertor A, to move the first optical system Le thereby to bring the latter into the in-focus condition.

It is to be noted that, while in the foregoing embodiment the second optical system CL has been described as driven at the high speed to the limit position in the focusing direction by the second optical system drive means SDM in the event that the focus control determining means PCJM has made a decision that the automatic focus control capability is not available, the high speed drive of the second optical system CL is not essential in the practice of the present invention according to the program flow shown in and described with reference to FIG. 20.

In any one of the foregoing embodiments of the present invention having been fully described, particularly those shown in FIGS. 11 and 20, the focusing amount x necessary to move the lens to the in-focus condition is determined on the basis of the current position data Lp of the convertor lens 1 and the defocus amount d, and then, the motor rotational amount $N(=k_D \times x)$ is determined on the basis of the conversion coefficient $k_D$ of a mechanical system obtained from the convertor lens 1.

However, as shown in Table 2, for a given defocus amount d, change of the current position data Lp does not substantially result in change of the focusing amount x. In view of this, in the case where the convertor lens 1 is mounted, arrangement may be made to determine the focusing amount x on the basis of the defocus amount d by the use of the look-up table in the AF microcomputer AMC and then to determine the motor rotational amount N on the basis of the conversion coefficient $k_D$ obtained from the convertor lens 1.

Also, arrangement may be made to transfer the data of the defocus amount d to the convertor so that the convertor can transfer from the defocus amount d to the AF microcomputer AMC the conversion coefficient $K_D$ including both of optical and mechanical elements as address data and so that the AF microcomputer AMC can subsequently calculate the equation of $(N=d \times K_D)$, as is the case with the usual lens assembly, to determine the motor rotational amount N.

In the case of the system wherein the lens control unit is provided on the side of any one of the lens assembly and the convertor, arrangement may be made to transfer the defocus amount d from the camera body C to the convertor so that the arithmetic operation, which has been described as taking place in the camera body C, can take place in the lens assembly or the convertor to determine the motor rotational amount N and then to drive the motor MO by the calculated rotational amount N.

Alternatively, in such system, and where such system employs a system wherein pulses used to monitor the movement of the lens are transmitted from the convertor lens to the camera body C, arrangement may be made to detect the count (focusing amount x) of the pulses, then to convert it into the defocus amount d, and finally to compare this data with the detected defocus amount d so that a stop signal necessary to bring the motor MO to a halt can be supplied from the camera body C to the convertor, or to convert the defocus amount d into the focusing amount x and then to compare this data with the count value.

Although in the foregoing embodiments information such as the full aperture value or preset aperture value of the interchangeable lens assembly B coupled with and and positioned frontwardly of the convertor is transmitted to the camera body C as the data AFAvo referred to above, it may happen that, if the convertor is of a type having a variable focal length, the information must be modified in a quantity dependent on the magnification of the convertor. By way of example, if the magnification is ×2 or 1.4, the quantity over which the information must be modified would be one F-stop number or 0.5 F-stop number, respectively.

In the practice of the present invention, it may be contemplated to drive the lens by transferring the data of the peculiar conversion coefficient $K_D$ from the convertor without determining the focusing amount x on the basis of the defocus amount d, and then to determine the rotational amount $N(=d\times K_D)$ as is the case with the usual lens assembly. In this case, it may happen that the lens may undergo hunting at a position adjacent the in-focus position with the focusing speed consequently lowered slightly. However, if this problem is deemed negligible, this system may be employed and bring about such advantages that the price of the convertor can be reduced and that the camera body need not have a function which ought to be performed by the convertor.

While the present invention has fully been described in connection with the preferred embodiments thereof with reference to the accompanying drawings, the present invention can bring about the following effects.

(a) Since the defocus amount/focusing amount data converting means serves to render the focusing amount of the second optical system of the AF convertor and the defocus amount, which have a non-linear relationship with each other, to have a certain one-to-one relationship, the focusing amount of the second optical system which is obtained by converting the defocus amount can be made a value enough to make the defocus amount zero.

The defocus amount/focusing amount data converting means is operable to convert the defocus amount so obtained into the optimum focusing amount data of the second optical system enough to make the defocus amount zero.

And, since prior to the actual focusing movement of the second optical system of the AF convertor the optical system drive means control the drive of the second optical system on the basis of the focusing amount data so obtained, the second optical system can be controlled during the actual focusing movement so that the defocus amount may be substantially zero.

In other words, since the focusing amount data can be obtained prior to the actual focusing movement of the second optical system, the automatic focusing capability can be effectively executed. Therefore, there is no possibility that the second optical system may undergo hunting at a position near the in-focus position such as occurring with the prior art feedback control system, and the high speed, highly precise automatic focusing can be accomplished.

(b) The function of the defocus amount detecting means, which has hitherto been provided in the automatic focusing device, for the determination of the defocus amount can be effectively utilized in improving the focusing accuracy.

(c) In the event that, while the AF interchangeable lens assembly is coupled with the AF convertor, the focus control cannot be achieved simply by the movement of the second optical system of the AF convertor, the focus control determining means makes a decision, on the basis of the focusing amount x, the current position data Lp, and the farthest or closest limit position data Lmax or Lo, that the focus control is impossible.

As a result thereof, the first optical system moving direction display means effects a display of the direction in which the first optical system of the interchangeable lens assembly is moved for focusing the target object from the defocused condition.

That is, the photographer can be informed that the movement of the second optical system only cannot result in the accurate focus control and, accordingly, the first optical system of the interchangeable lens assembly has to be moved for the focus control.

Accordingly, the manipulation necessary to move the first optical system for the focus control, which is to be done by the photographer, can be quickly carried out.

(d) In the event that the focus control determining means makes a decision that the focus control is impossible, the second optical system drive means drives the second optical system of the AF convertor towards the limit position in search for the true focus setting.

Then, the photographer manually moves the first optical system after he has been informed of the incapability of focus control and of the direction in which the first optical system is to be moved in search for the true focus setting. Since during the focusing the second optical system has been moved to the limit position so that the movement of the first optical system necessitated for the true focus setting could be minimized, the photographer can quickly carry out the focus control.

(e) Since in the event that the first photo-taking optical system adaptable to the full aperture metering and exposure calculating means is mounted the mounted optical system detecting means detects the mountig of such first photo-taking optical system to enable the control means to drive both of the automatic focus adjusting means and the full aperture metering and exposure calculating means, both of the exposure control and the automatic focus adjustment appropriate to the first photo-taking optical system can be performed.

(f) Since the control means drives both of the automatic focus adjusting means and the actual aperture metering and calculating means in the event that the mounted optical system detecting means detects the mounting of the second optical system inadaptable to the full aperture metering and exposure calculating means, the automatic focus adjustment and the proper exposure control based on the actual aperture metering and exposure calculating means can be performed inspite of the fact that the second photo-taking optical system inadaptable to the full aperture metering and exposure calculating means has been mounted.

(g) In the event that none of the first and second photo-taking optical systems is mounted, the mounted optical system detecting means detects the non-mounted condition and the control means disables the automatic focus adjusting means and drives the actual aperture metering and exposure calculating means. Therefore, even in this case, the proper exposure control appropriate to the photo-taking system then used can be performed.

Although some other changes and modifications are apparent to those skilled in the art as well, they should be construed as included within the scope of the present invention as defined by the appended claims unless they depart therefrom.

We claim:

1. An automatic focusing device which comprises:
    a defocus amount detecting means for detecting a defocus amount attributable to a first optical system of an interchangeable lens assembly and a second optical system of an AF convertor;
    a position data outputting means for outputting position data representative of the position of the second optical system;
    a converting means for converting said defocus amount, taken into consideration with the position data, into data corresponding to a focusing amount of the second optical system which varies in nonlinear relationship to said defocus amount; and
    an optical drive means for moving the second optical system on the basis of the data representative of the focusing amount supplied from the converting means.

2. An automatic focusing device which comprises:
    a focusing amount calculating means for calculating a focusing amount of a second optical system of an AF convertor, which amount is necessary to bring an image of a target object, passing through both of a first optical system of an interchangeable lens assembly and the second optical system of the AF convertor, into an in-focus condition;
    a current position data outputting means for outputting a data representative of the current position of the second optical system;
    a limit position data outputting means for outputting a first limit position data representative of the limit position for the extension of the second optical system and also a second limit position data representative of the limit position for the retraction of the second optical system;
    a focus control determining means for determining, on the basis of the combination of the focusing amount supplied from the calculating means, the data representative of the current position and the data representative of the first or second limit position, whether or not the target object can be controlled into the in-focus condition if said second optical system is moved a distance corresponding to the focusing amount; and
    a first means for displaying the direction in which the first optical system of the interchangeable lens assembly is to be moved for bringing the target object, which is in a defocused condition, into the in-focus condition, in the event that said determining means makes a negative decision.

3. The device as claimed in claim 2, further comprising a second means for driving the second optical means to one of the first and second limit positions in a direction in which the in-focus condition lies, in the event that said determining means makes the negative decision.

4. An automatic exposure control device which comprises:
    a full aperture metering means;
    an actual aperture metering means;
    a mounted optical system detecting means for detecting a first condition in which a first photo-taking optical system adaptable to said full aperture metering means is mounted, a second condition in which a second photo-taking optical system inadaptable to said full aperture metering means is mounted, and a third condition in which none of the first and second photo-taking optical systems is mounted;
    an automatic focus adjusting means capable of adjusting the focus of the first photo-taking optical system and the focus of the second photo-taking optical system; and
    a control means for enabling both of said automatic focus adjusting means and said full aperture metering means upon the detection of the first condition by said mounted optical system detecting means, for enabling both of said automatic focus adjusting means and said actual aperture metering means upon the detection of the second condition by said mounted optical system detecting means, and for disabling said automatic focus adjusting means and enabling said actual aperture metering means upon the detection of the third condition by said mounted optical system detecting means.

* * * * *